US012630087B2

(12) United States Patent
Esser et al.

(10) Patent No.: US 12,630,087 B2
(45) Date of Patent: May 19, 2026

(54) VEHICULAR EXTERIOR REARVIEW MIRROR ACTUATOR

(71) Applicant: Magna Mirrors of America, Inc., Holland, MI (US)

(72) Inventors: Robert L. Esser, Rockford, MI (US); Rudy A. Morey, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 950 days.

(21) Appl. No.: 17/811,077

(22) Filed: Jul. 7, 2022

(65) Prior Publication Data

US 2023/0009664 A1 Jan. 12, 2023

Related U.S. Application Data

(60) Provisional application No. 63/263,536, filed on Nov. 4, 2021, provisional application No. 63/203,069, filed on Jul. 7, 2021.

(51) Int. Cl.
B60R 1/074 (2006.01)
B60R 1/072 (2006.01)

(52) U.S. Cl.
CPC .............. B60R 1/074 (2013.01); B60R 1/072 (2013.01)

(58) Field of Classification Search
CPC .......... B60R 1/074; B60R 1/072; B60R 1/04; B60R 1/025; B60R 1/086; B60R 1/087; B60R 2001/1223; G02B 17/04; G02F 1/13318; G02F 1/153
USPC ........................................................ 359/877
See application file for complete search history.

(56) References Cited

U.S. PATENT DOCUMENTS

| | | | |
|---|---|---|---|
| 2,263,382 A | 11/1941 | Gotzinger |
| 2,580,014 A | 12/1951 | Gazda |
| 3,266,016 A | 8/1966 | Maru |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |
| 4,906,085 A | 3/1990 | Sugihara et al. |
| 5,313,335 A | 5/1994 | Gray et al. |
| 5,355,284 A | 10/1994 | Roberts |
| 5,436,741 A | 7/1995 | Crandall |
| 5,481,409 A | 1/1996 | Roberts |

(Continued)

*Primary Examiner* — Bumsuk Won
*Assistant Examiner* — Rahman Abdur
(74) *Attorney, Agent, or Firm* — HONIGMAN LLP

(57) ABSTRACT

A vehicular exterior rearview mirror assembly includes a mounting arm and a mirror head. The mounting arm is received through an aperture in the mirror head, and an actuator is attached at the mounting arm within the mirror head. The actuator is operable to adjust the mirror head relative to the mounting arm and includes first and second motors that drive respective first and second gears. The first gear engages an arcuate gear disposed at an attachment element attached at the mirror head, and when the first motor is operated, the arcuate gear and the attachment element pivot relative to the actuator to adjust the mirror head about a first pivot axis. The second gear engages a rotationally fixed gear rotationally fixed to the mounting arm, and when the second motor is operated, the actuator travels about the second gear to adjust the mirror head about a second pivot axis.

29 Claims, 23 Drawing Sheets

(56) References Cited

U.S. PATENT DOCUMENTS

| | | | |
|---|---|---|---|
| 5,530,240 A | 6/1996 | Larson et al. | |
| 5,575,552 A | 11/1996 | Faloon et al. | |
| 5,587,699 A | 12/1996 | Faloon et al. | |
| 5,668,663 A | 9/1997 | Varaprasad et al. | |
| 5,703,731 A | 12/1997 | Boddy et al. | |
| 5,724,187 A | 3/1998 | Varaprasad et al. | |
| 5,786,772 A | 7/1998 | Schofield et al. | |
| 5,788,357 A | 8/1998 | Muth et al. | |
| 5,900,999 A | 5/1999 | Huizenga et al. | |
| 5,938,166 A | 8/1999 | Seichter et al. | |
| 5,938,320 A | 8/1999 | Crandall | |
| 5,956,181 A | 9/1999 | Lin | |
| 5,986,364 A | 11/1999 | Bingle et al. | |
| 6,005,724 A | 12/1999 | Todd | |
| 6,045,243 A | 4/2000 | Muth et al. | |
| 6,111,683 A | 8/2000 | Cammenga et al. | |
| 6,213,612 B1 | 4/2001 | Schnell et al. | |
| 6,229,226 B1 | 5/2001 | Kramer et al. | |
| 6,243,218 B1 | 6/2001 | Whitehead | |
| 6,257,746 B1 | 7/2001 | Todd et al. | |
| 6,264,353 B1 | 7/2001 | Caraher et al. | |
| 6,312,135 B1 | 11/2001 | Polzer | |
| 6,329,925 B1 | 12/2001 | Skiver et al. | |
| 6,356,376 B1 | 3/2002 | Tonar et al. | |
| 6,362,548 B1 | 3/2002 | Bingle et al. | |
| 6,428,172 B1 | 8/2002 | Hutzel et al. | |
| 6,467,920 B2 | 10/2002 | Schnell et al. | |
| 6,512,624 B2 | 1/2003 | Tonar et al. | |
| 6,642,840 B2 | 11/2003 | Lang et al. | |
| 6,685,864 B2 | 2/2004 | Bingle et al. | |
| 6,690,268 B2 | 2/2004 | Schofield et al. | |
| 6,698,905 B1 | 3/2004 | Whitehead | |
| 6,700,692 B2 | 3/2004 | Tonar et al. | |
| 6,755,544 B2 | 6/2004 | Schnell et al. | |
| 6,916,100 B2 | 7/2005 | Pavao | |
| 7,073,914 B2 | 7/2006 | Pavao | |
| 7,080,914 B1 | 7/2006 | Boddy | |
| 7,093,946 B2 | 8/2006 | Barve et al. | |
| 7,104,663 B2 | 9/2006 | Whitehead | |
| 7,159,992 B2 | 1/2007 | Foote | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,253,723 B2 | 8/2007 | Lindahl et al. | |
| 7,255,451 B2 | 8/2007 | McCabe et al. | |
| 7,255,541 B2 | 8/2007 | Kuramoto et al. | |
| 7,267,449 B1 | 9/2007 | Boddy et al. | |
| 7,274,501 B2 | 9/2007 | McCabe et al. | |
| 7,289,037 B2 | 10/2007 | Uken et al. | |
| 7,314,285 B2 | 1/2008 | Ruse et al. | |
| 7,338,177 B2 | 3/2008 | Lynam | |
| 7,360,932 B2 | 4/2008 | Uken et al. | |
| 7,370,983 B2 | 5/2008 | DeWind et al. | |
| 7,446,650 B2 | 11/2008 | Scholfield et al. | |
| 7,446,924 B2 | 11/2008 | Schofield et al. | |
| 7,488,080 B2 | 2/2009 | Skiver et al. | |
| 7,581,859 B2 | 9/2009 | Lynam | |
| 7,626,749 B2 | 12/2009 | Baur et al. | |
| 7,722,199 B2 | 5/2010 | DeWard et al. | |
| 7,777,611 B2 | 8/2010 | Desai | |
| 7,855,755 B2 | 12/2010 | Weller et al. | |
| 8,049,640 B2 | 11/2011 | Uken et al. | |
| 8,154,418 B2 | 4/2012 | Peterson et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 8,764,256 B2 | 7/2014 | Foote et al. | |
| 8,915,601 B2 | 12/2014 | Foote et al. | |
| 8,960,629 B2 | 2/2015 | Rizk et al. | |
| 9,067,541 B2 | 6/2015 | Sobecki et al. | |
| 9,346,403 B2 | 5/2016 | Uken et al. | |
| 9,487,142 B2 | 11/2016 | Sobecki et al. | |
| 9,598,016 B2 | 3/2017 | Blank et al. | |
| 9,827,913 B2 | 11/2017 | De Wind et al. | |
| 10,029,614 B2 | 7/2018 | Larson | |
| 10,046,706 B2 | 8/2018 | Larson et al. | |
| 10,099,618 B2 | 10/2018 | Foote et al. | |
| 10,166,924 B2 | 1/2019 | Baur | |
| 10,421,404 B2 | 9/2019 | Larson et al. | |
| 10,442,360 B2 | 10/2019 | LaCross et al. | |
| 10,948,798 B2 | 3/2021 | Lynam et al. | |
| 11,214,199 B2 | 1/2022 | LaCross et al. | |
| 11,351,919 B2 | 6/2022 | Esser | |
| 11,465,561 B2 | 10/2022 | Peterson et al. | |
| 11,498,494 B2 | 11/2022 | Lynam et al. | |
| 11,505,123 B2 | 11/2022 | Lu | |
| 2004/0027694 A1 | 2/2004 | Lin | |
| 2004/0027695 A1 | 2/2004 | Lin | |
| 2006/0050018 A1 | 3/2006 | Hutzel et al. | |
| 2007/0002477 A1 | 1/2007 | Whitehead | |
| 2008/0049344 A1 | 2/2008 | DeWard et al. | |
| 2008/0073477 A1 | 3/2008 | Lang et al. | |
| 2012/0038964 A1 | 2/2012 | De Wind et al. | |
| 2012/0236388 A1 | 9/2012 | De Wind et al. | |
| 2014/0022390 A1 | 1/2014 | Blank et al. | |
| 2014/0097320 A1 | 4/2014 | Rizk et al. | |
| 2014/0268355 A1 | 9/2014 | Lee et al. | |
| 2014/0285666 A1 | 9/2014 | O'Connell et al. | |
| 2014/0293169 A1 | 10/2014 | Uken et al. | |
| 2014/0313563 A1 | 10/2014 | Uken et al. | |
| 2015/0085337 A1 | 3/2015 | Lee et al. | |
| 2015/0097955 A1 | 4/2015 | De Wind et al. | |
| 2016/0082890 A1 | 3/2016 | Habibi et al. | |
| 2016/0129842 A1 | 5/2016 | Kuester | |
| 2016/0250970 A1 | 9/2016 | Kuester et al. | |
| 2016/0250972 A1 | 9/2016 | Kuester et al. | |
| 2016/0250974 A1 | 9/2016 | Kuester et al. | |
| 2016/0275833 A1 | 9/2016 | Forbes et al. | |
| 2016/0341963 A1 | 11/2016 | Minikey, Jr. et al. | |
| 2017/0088055 A1 | 3/2017 | Cammenga et al. | |
| 2017/0248787 A1 | 8/2017 | Lee et al. | |
| 2017/0297498 A1 | 10/2017 | Larson et al. | |
| 2017/0327044 A1 | 11/2017 | Baur | |
| 2017/0355312 A1 | 12/2017 | Habibi et al. | |
| 2018/0134217 A1 | 5/2018 | Peterson et al. | |
| 2018/0244204 A1 | 8/2018 | Boehm | |
| 2018/0251069 A1 | 9/2018 | LaCross et al. | |
| 2018/0329210 A1 | 11/2018 | Lee et al. | |
| 2019/0047475 A1 | 2/2019 | Uken et al. | |
| 2019/0118717 A1 | 4/2019 | Blank et al. | |
| 2019/0146297 A1 | 5/2019 | Lynam et al. | |
| 2019/0258131 A9 | 8/2019 | Lynam et al. | |
| 2019/0381938 A1 | 12/2019 | Hopkins | |
| 2020/0223364 A1 | 7/2020 | Peterson et al. | |
| 2020/0353867 A1 | 11/2020 | Huizen et al. | |
| 2021/0213880 A1* | 7/2021 | Esser | G02B 7/182 |
| 2021/0323477 A1 | 10/2021 | LaCross et al. | |
| 2022/0324384 A1 | 10/2022 | Steffes | |

* cited by examiner

Mirror Upper Housing

Mounting Bracket Fixation to Mirror Lower Housing

26 Motor

Electrical Interface PCB

32 Lower Housing

36 Horizontal Pivot Main Gear

44 Horizontal Pivot Clutch Gear

22 Mounting Bracket

Output Gear to Mounting Bracket

28

50 Horizontal Pivot PCB with Memory Traces

50a

52 Horizontal Pivot Memory Wiper

42 Horizontal Pivot Memory Output Gear

24

30 Actuator Upper Housing

46 Pivot Tube

Pal Nut

48 Pivot Spring

40 Geartrain Retainer

54 Vertical Pivot Memory PCB

58 Vertical Pivot Memory Interface Ring

Vertical Pivot Memory Sleeve

32 Actuator Lower Housing

22 Mounting Bracket

Upper Housing
30

Vertical Axis Pivot

Mounting Bracket
22

Lower Housing
32

Horizontal Axis Pivot

Mirror Head Out Rotation

Mirror Head Nominal

Mirror Head In Rotation

VEHICULAR EXTERIOR REARVIEW MIRROR ACTUATOR

CROSS REFERENCE TO RELATED APPLICATIONS

The present application claims priority of U.S. provisional application Ser. No. 63/263,536, filed Nov. 4, 2021, and U.S. provisional application Ser. No. 63/203,069, filed Jul. 7, 2021, which are hereby incorporated herein by reference in their entireties.

FIELD OF THE INVENTION

The present invention relates generally to the field of rearview mirror assemblies for vehicles and, more particularly, to an exterior rearview mirror assembly that is operable to adjust a rearward field of view of the driver of the vehicle.

BACKGROUND OF THE INVENTION

Typically, an exterior rearview mirror assembly includes a mirror actuator that is operable to adjust a mirror reflective element relative to the mirror casing so as to adjust a rearward view of the driver of the vehicle. The reflective element and actuator are disposed in the mirror casing and the actuator adjusts the reflective element relative to the mirror casing. Powerfold exterior mirror assemblies include an actuator disposed at a mounting structure that pivots or folds the mirror casing relative to the side of the vehicle.

SUMMARY OF THE INVENTION

A vehicular exterior rearview mirror assembly (such as an exterior mirror assembly mounted at a side of an equipped vehicle) includes a mounting arm that includes an attaching end configured for attachment at an exterior portion of a vehicle equipped with the vehicular exterior rearview mirror assembly and a distal end distal from the attaching end. A mirror head includes a mirror reflective element. The distal end of the mounting arm is received through an aperture in the mirror head. An electrically operable actuator is disposed at the distal end of the mounting arm within the mirror head. The actuator is electrically operable to adjust the mirror head relative to the mounting arm and, when the actuator is electrically operating to adjust the mirror head relative to the mounting arm, the mirror reflective element moves in tandem with the mirror head relative to the mounting arm. The aperture allows for movement of the mirror head relative to the mounting arm. The actuator includes an actuator attachment element that attaches at the mirror head. The actuator includes first and second electrically operable motors that drive respective first and second gears. An arcuate first pivot gear is disposed at the actuator attachment element. The first gear engages the arcuate first pivot gear disposed at the actuator attachment element. When the first electrically operable motor is electrically operated, the arcuate first pivot gear and actuator attachment element pivot relative to the actuator to adjust the mirror head about a first pivot axis (such as a horizontal pivot axis). A second pivot gear is disposed at the distal end of the mount arm and is rotationally fixed relative to the mounting arm. The second gear engages the second pivot gear. When the second electrically operable motor is electrically operated, the actuator moves relative to the second pivot gear to adjust the mirror head about a second pivot axis (such as a vertical pivot axis). The actuator includes a first pivot memory element that electronically tracks position of the actuator relative to the actuator attachment element as the mirror head pivots about the first pivot axis. The actuator includes a second pivot memory element that electronically tracks position of the actuator relative to the second pivot gear as the mirror head pivots about the second pivot axis.

These and other objects, advantages, purposes and features of the present invention will become apparent upon review of the following specification in conjunction with the drawings.

DESCRIPTION OF THE PREFERRED EMBODIMENTS

Figure 1:
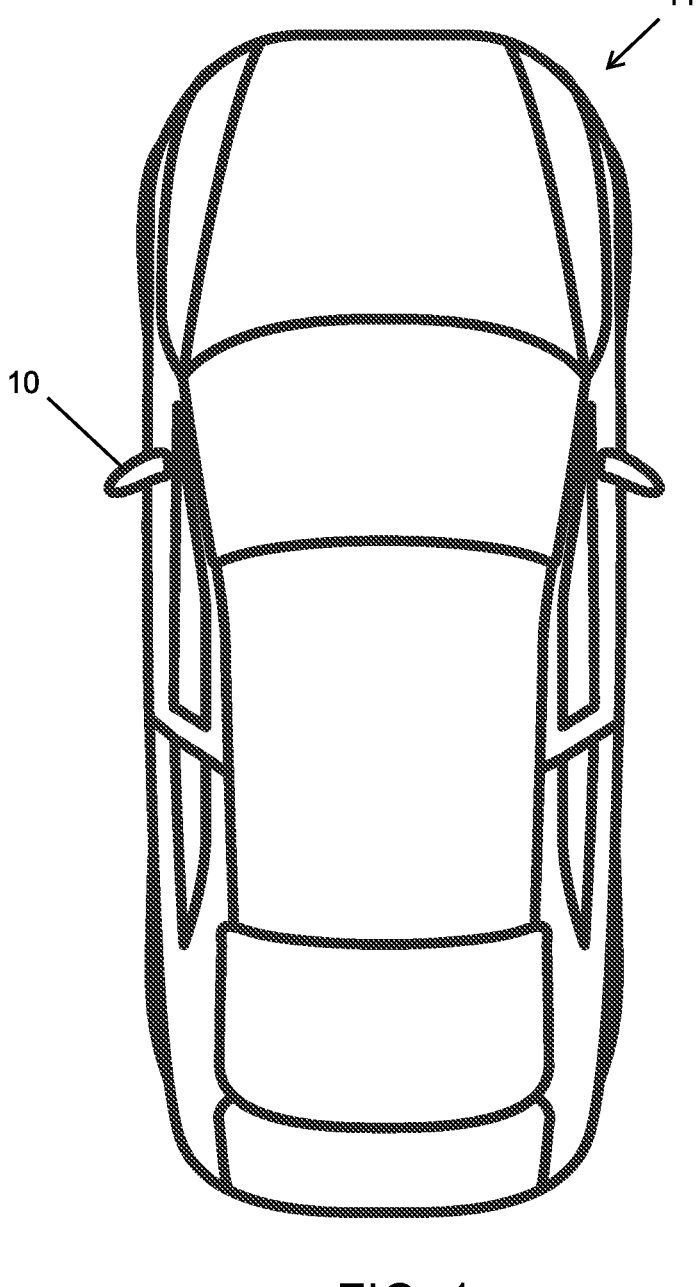
FIG. 1 is a plan view of a vehicle equipped with an exterior rearview mirror assembly.

Referring now to the drawings and the illustrative embodiments depicted therein, a vehicular exterior rearview mirror assembly 10 comprises a dual motor actuator and dual pivot axes for adjusting a mirror head 12 and reflective element 14 relative to a side of a vehicle 11 (such as at a vehicle door) at which the mirror assembly 10 is mounted (FIG. 1). The mirror assembly may utilize aspects of the mirror assemblies described in U.S. Pat. Nos. 9,487,142, 10,099,618, 9,827,913 and/or 9,346,403, and/or U.S. Publication Nos. US-2020-0353867 and/or US-2020-0223364, which are hereby incorporated herein by reference in their entireties.

The actuator allows pivoting of the mirror head about separate horizontal and vertical axes. The actuator includes an actuator housing that houses or encases separate motors and gear trains to electrically pivot or rotate the mirror head about each axis. The mirror housing or casing attaches to the actuator through a mounting bracket. The mounting bracket is constrained to a lower housing of the actuator and pivots relative to the actuator or actuator housing about the horizontal axis pivot. The actuator is also attached to the mirror base and the actuator body (upper and lower housing and everything within) pivots about the vertical axis pivot. Because the mounting bracket is constrained through the lower housing of the actuator, the mounting bracket and elements or components attached to the mounting bracket (e.g., the mirror head via attachment between the mounting bracket and lower mirror housing) will pivot about the vertical axis when the actuator housing or body pivots about the vertical axis. Thus, the actuator operates to pivot the mounting bracket and mirror head about the horizontal axis relative to the actuator housing and the actuator operates to pivot the actuator housing, mounting bracket, and mirror head about the vertical axis relative to the mirror base (e.g., the mounting arm mounting the mirror head at the side of the vehicle). The actuator further allows for manual pivoting of the mirror head about the vertical and horizontal axes via clutch assemblies of the respective gear trains.

Figure 2:
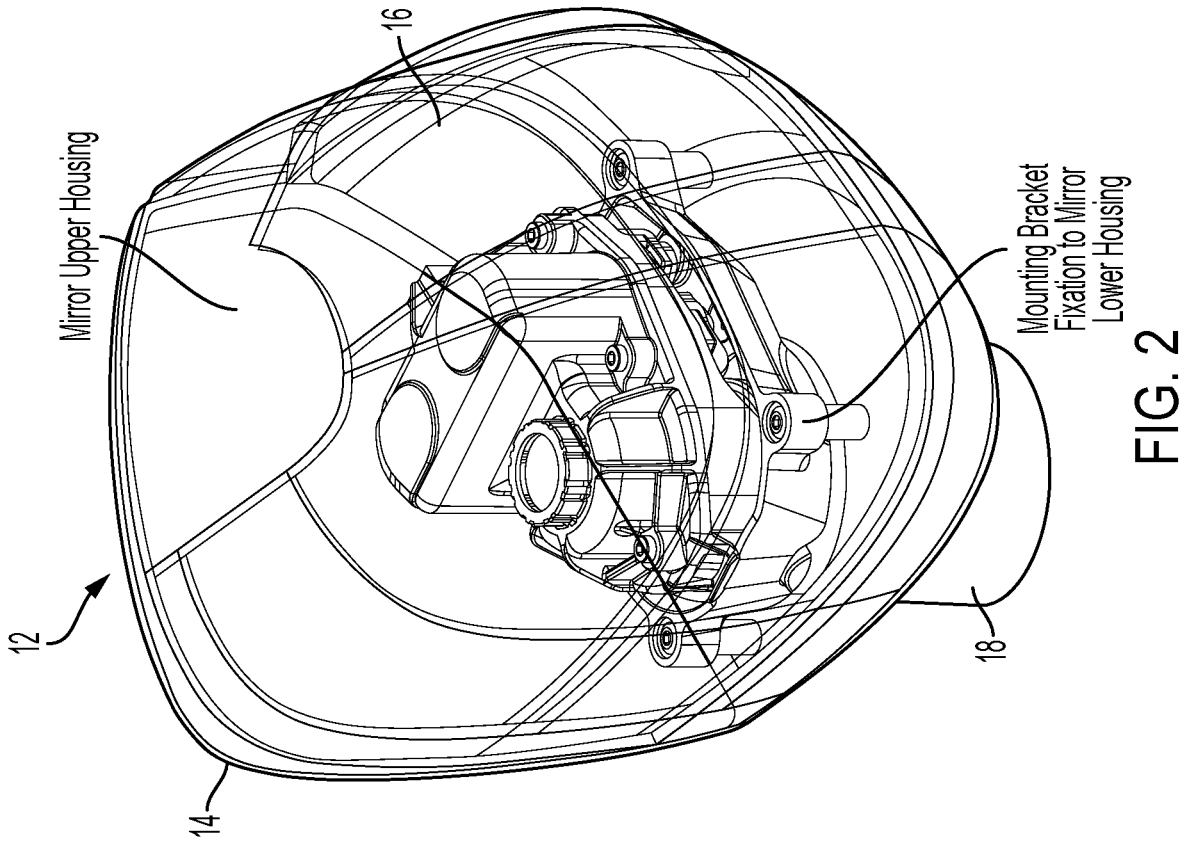
FIG. 2 is a perspective view of an exterior rearview mirror assembly.
Figure 3:
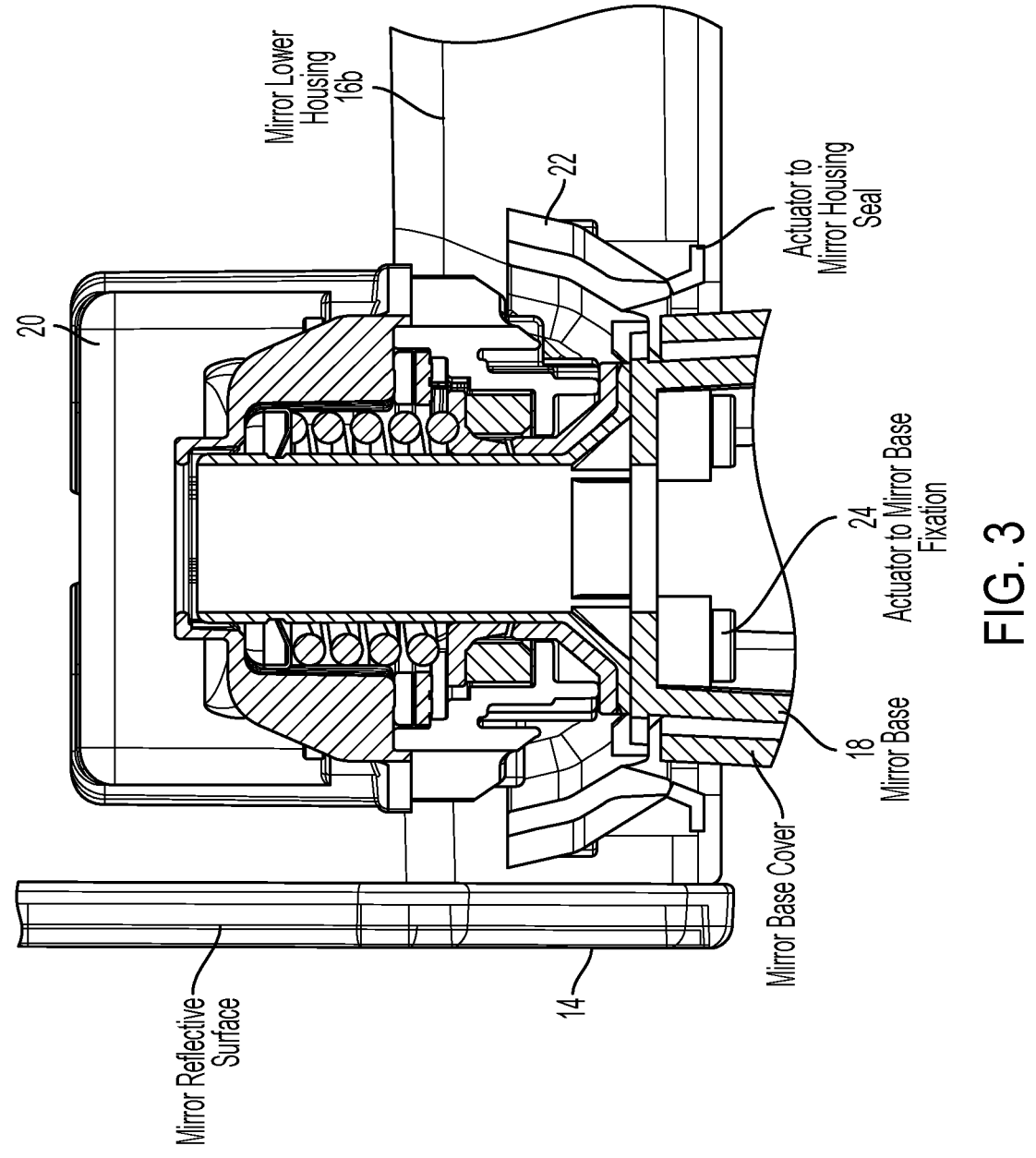
FIG. 3 is a cross-sectional view of the exterior rearview mirror assembly with the upper mirror casing removed.
Figures 4A, 4B:
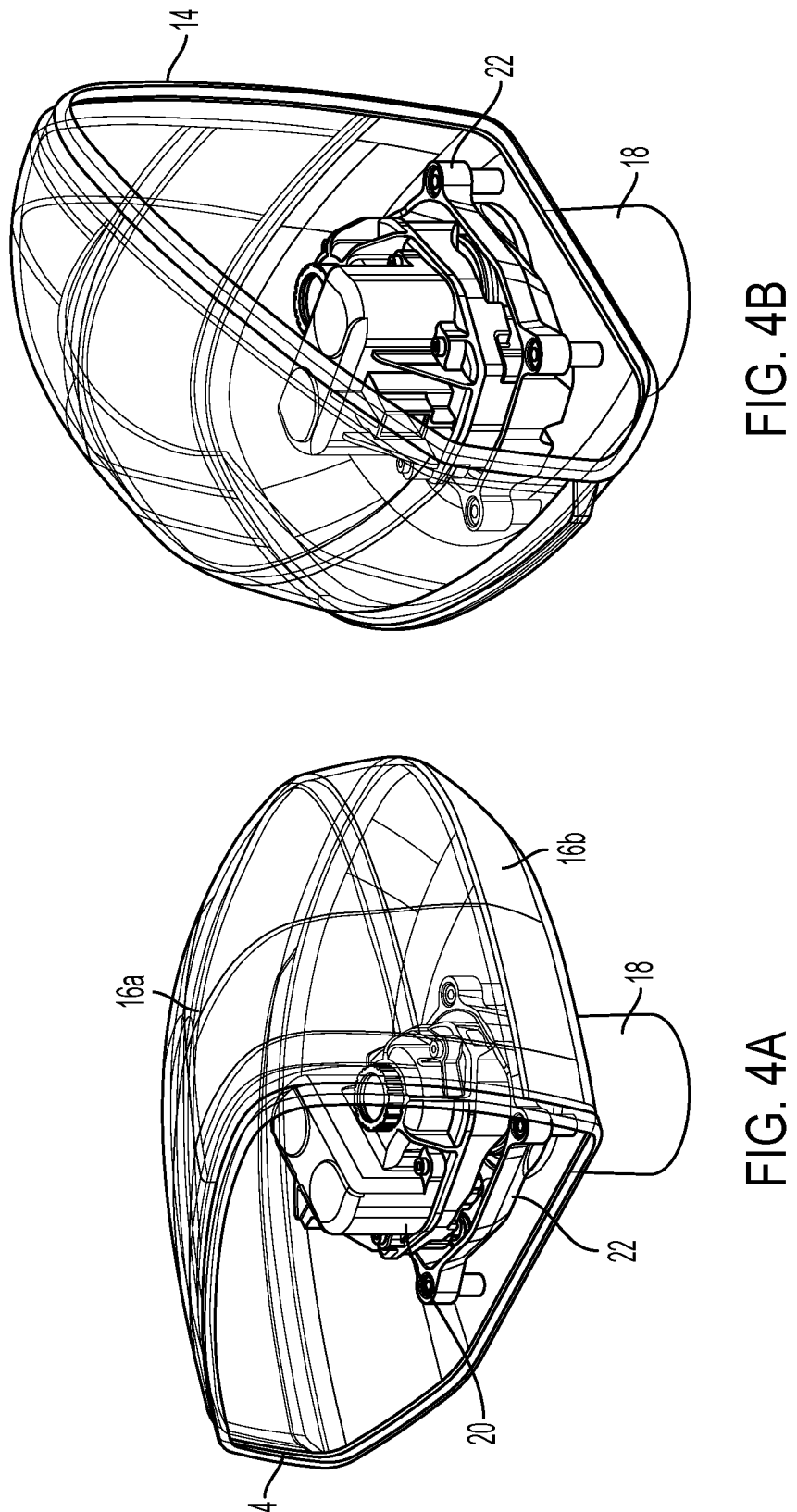
FIGS. 4A-4D are perspective views of the exterior rearview mirror assembly.
Figure 4D:
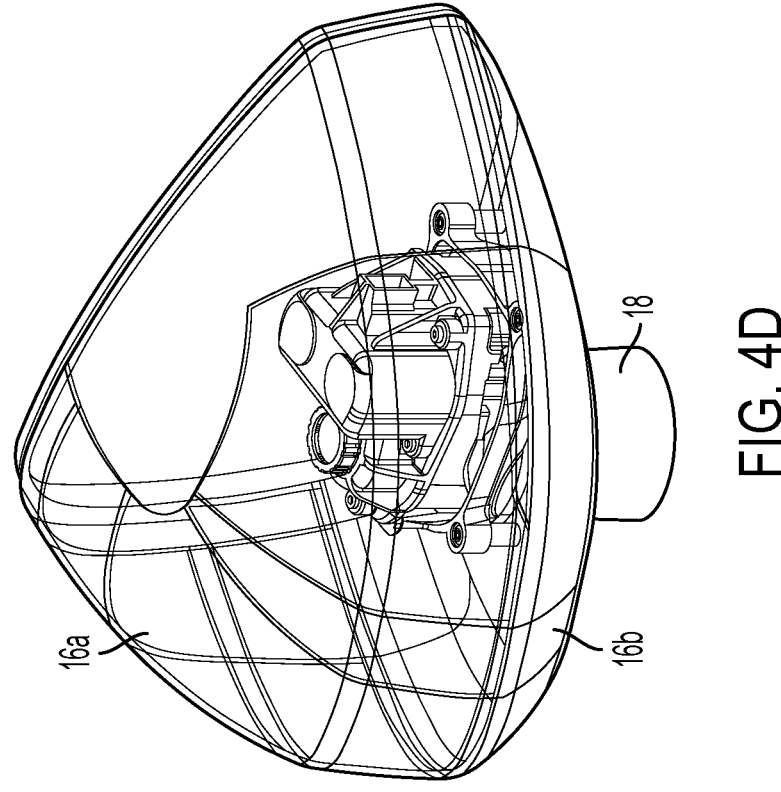
Figure 4C:
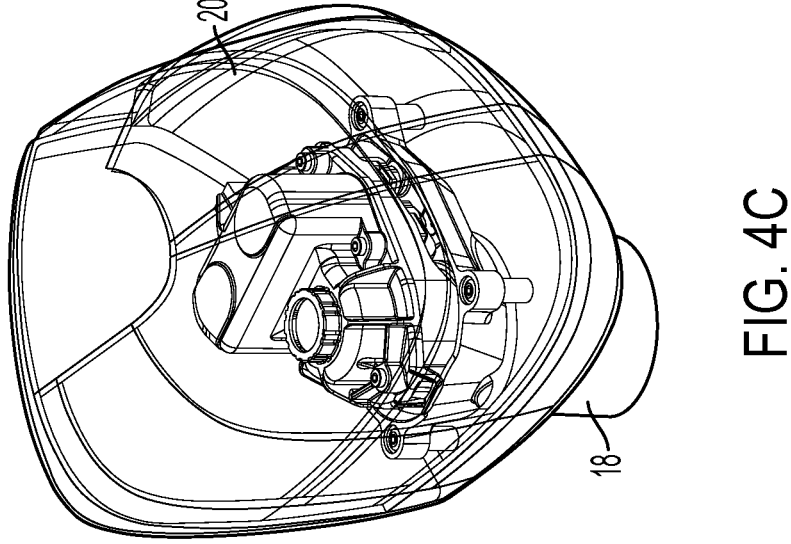
Figures 5A, 5B, 5C, 5D:
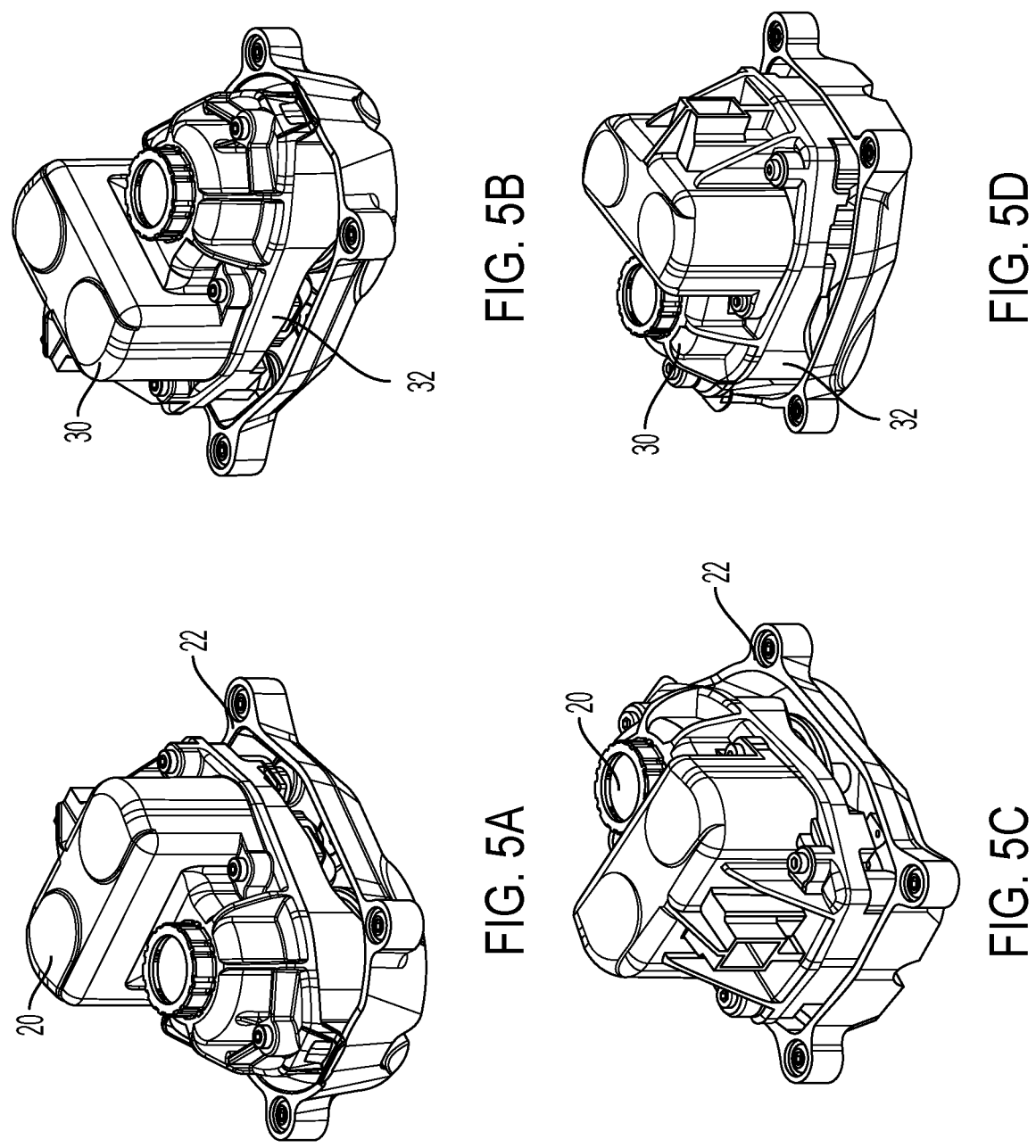
FIGS. 5A-5D are perspective views of an actuator of the exterior rearview mirror assembly.
Figure 6:
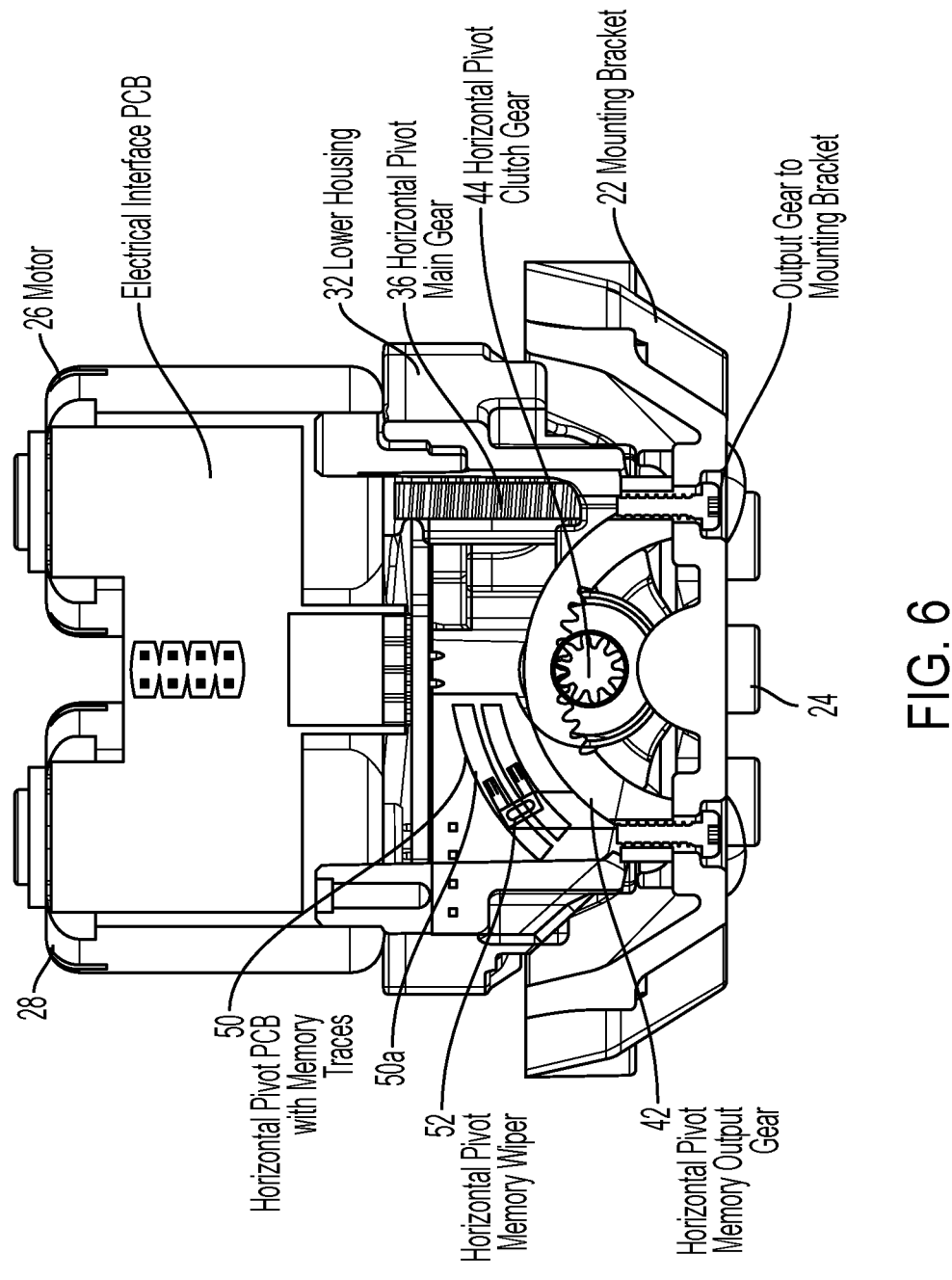
FIG. 6 is a cross-sectional view of the actuator showing components of the actuator that enable the actuator to be operable to pivot the mirror head about a horizontal pivot axis.

As shown in FIGS. 2 and 3, the vehicular exterior rearview mirror assembly 10 includes the mirror reflective element 14 and a mirror casing or housing 16 (which may comprise an upper housing 16*a* and a lower housing 16*b*).

The mirror housing 16 is attached at an actuator 20 that is operable to adjust the mirror reflective element relative to a mounting arm or mirror base portion 18. The mirror reflective element 14 may be attached to the mirror casing 16 in any suitable fashion, such as via a head mounting plate, which may be disposed at the rear of and attached at a back plate disposed at the rear of the mirror reflective element 14. The actuator 20 includes a mounting bracket 22 that is attached at the mirror casing 16, and the actuator includes a first attachment element or vertical adapter plate 24 that is attached at the mounting arm or base portion 18. The mirror head 12 includes the mirror reflective element 14, the mirror housing 16, and any intermediate attachment elements (such as the head mounting plate and/or back plate) attaching the mirror reflective element 14 and the housing 16, with the actuator 20 contained within the housing 16 behind the mirror reflective element 14.

The mirror head 12 (including the mirror casing and mirror reflective element) is adjustable (with the mirror casing and mirror reflective element being adjustable together and in tandem) relative to the mounting arm 18 via the actuator 20 attached to the mounting arm via the vertical adapter plate 24 and attached to the mirror casing 16 at the second attaching element or mounting bracket 22. The mounting arm (or a lower portion of the actuator) is received through a gap or aperture or opening of the lower mirror casing 16*b*, with the opening providing clearance or a gap between the casing wall and the mounting arm to allow for adjustment of the mirror head (including the mirror casing and reflective element) relative to the mounting arm 18. The mirror casing 16 and reflective element 14 are thus adjusted together and in tandem (i.e., the mirror reflective element does not adjust relative to the mirror casing). For example, the reflective element may be fixed relative to the mirror casing and adjusted with the mirror casing and attaching elements utilizing aspects described in U.S. Pat. No. 11,351, 919, which is hereby incorporated herein by reference in its entirety.

A gasket or head seal is provided at the opening of the lower mirror casing to generally seal or close over the opening of the mirror casing to limit water or dirt intrusion into the mirror casing. For example, the head seal may be disposed between and connect the mirror casing at the aperture and the mounting bracket 22. The head seal may comprise any suitable material, such as, for example, an EPDM rubber material. For example, the head seal may comprise a flexible bellows configuration or design that allows movement of the mirror head relative to the mounting base and protects the internal components of the mirror assembly from water and contamination.

In the illustrated embodiment, the mirror casing 16 is fixed relative to the glass or reflective element 14 and is adjustable (together and in tandem) via the actuator 20 relative to the mounting arm or mounting base 18. In a typical exterior sideview mirror, the reflective element is adjustable independently of the mirror head, which is fixed to the mounting arm. In the illustrated embodiment, the mirror casing 16 moves with the reflective element 14 (so that the mirror head is adjusted to adjust the rearward field of view at the reflective element). For sake of clarity, the assembly of the mirror casing 16 (and any such head mounting plate, glass-case or back plate, tape that adheres the mirror reflective element at the back plate) and reflective element 14 is referred to as the mirror head or mirror head assembly 12.

As shown in FIGS. 4A-4D, the actuator 20 is mounted at the vertical adapter plate 24 at the upper end of the mounting arm 18 or post or structure and is operable to adjust the reflective element 14 and mirror casing 16 (together and in tandem) relative to the mounting arm 18 to adjust the rearward field of view of the driver viewing the reflective element 14 when the mirror assembly 10 is mounted at the side of the vehicle 11. The actuator 20 is positioned behind the mirror reflective element 14 and imparts pivotal movement on the mirror head 12 via the mounting bracket 22, which is fixed relative to the lower portion 16*b* of the mirror casing. The actuator 20 pivots the mounting bracket (and therefore mirror head) about a horizontal pivot axis relative to the actuator or actuator housing. In other words, when pivoting the mirror head about the horizontal pivot axis, the actuator housing remains stationary and pivots the mounting bracket 22 and mirror head 12 relative to the actuator housing.

The actuator 20 also provides a powerfold function that operates to pivot the mirror head 12 about a generally vertical or canted axis between a use position (where the mirror head 12 is extended from the side of the vehicle and the reflective element 14 is viewable by the driver of the vehicle and provides the driver with the desired or selected rearward field of view) and a folded or non-use or park position (where the mirror head 12 is folded toward the side of the vehicle so that the reflective element 14 is generally along the side of the vehicle and does not provide the driver with the selected rearward field of view). The mirror head 12 may also pivot about the generally vertical or canted pivot axis to provide a breakaway mirror configuration, where the mirror head 12 may pivot beyond the use position in a direction opposite the folded position to a forward fold position (such as upon impact with an object). The actuator 20 is also operable to pivot the mirror head 12 about the vertical axis to a lesser degree to provide adjustment of the position of the mirror reflective element 14 to adjust the field of view of the driver viewing the mirror reflective element 14. Because the actuator or actuator housing is constrained to the mounting bracket 22 (which is fixed relative to the lower housing 16*b* of the mirror head 12), when the actuator 20 is operated to pivot the mirror head 12 about the vertical pivot axis, the actuator housing and mounting bracket 22 pivot together and in tandem with the mirror head 12. Thus, the actuator 20 is operable to pivot the mirror head 12 about the horizontal pivot axis while the actuator housing remains stationary relative to the horizontal pivot axis, and the actuator 20 is operable to pivot the mirror head 12 about the vertical pivot axis whereby the actuator housing pivots with the mirror head 12 about the vertical pivot axis.

Figures 8, 9, 10:
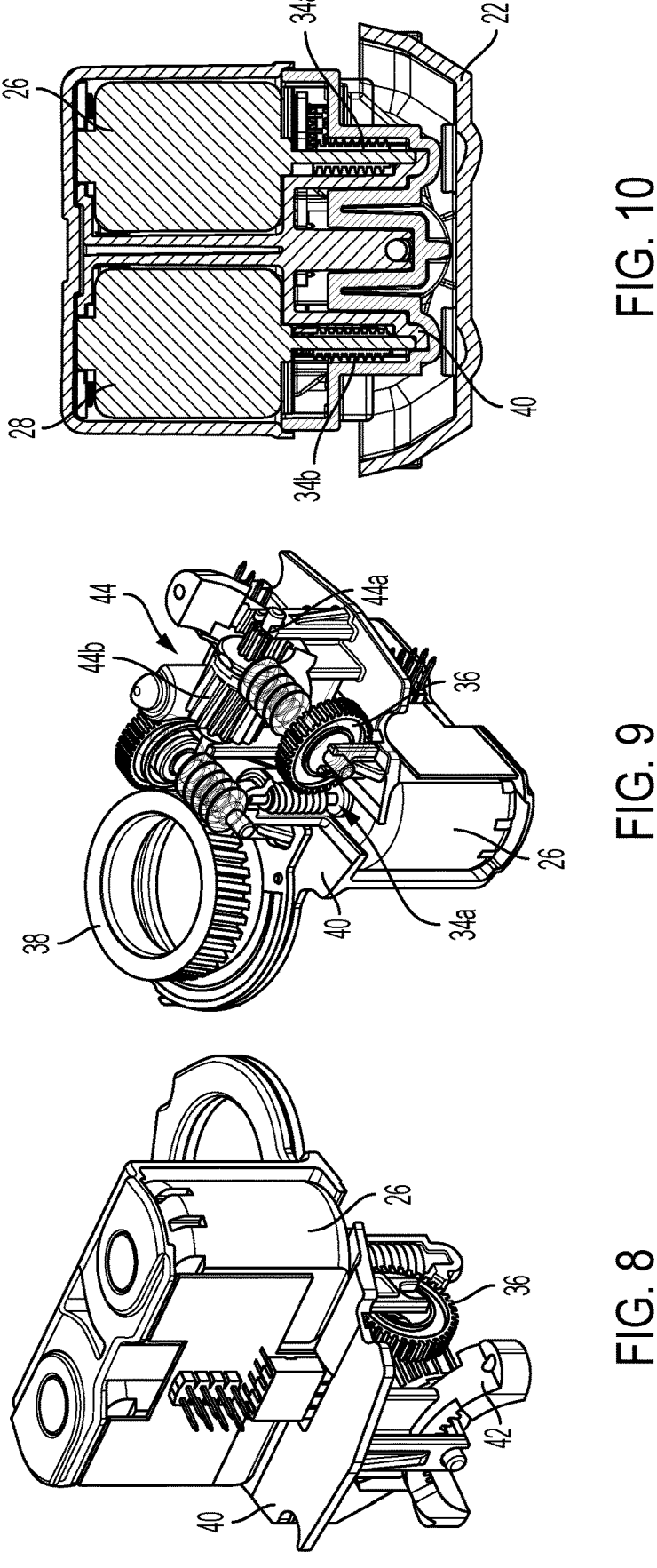
FIGS. 8 and 9 are perspective views of the vertical pivot motor, the horizontal pivot motor, the vertical pivot gear train, the horizontal pivot gear train, and the gear train retainer of the actuator.
FIG. 10 is a cross-sectional view of the respective vertical pivot and horizontal pivot motors and gear trains and the gear train retainer of the actuator.
Figure 11:
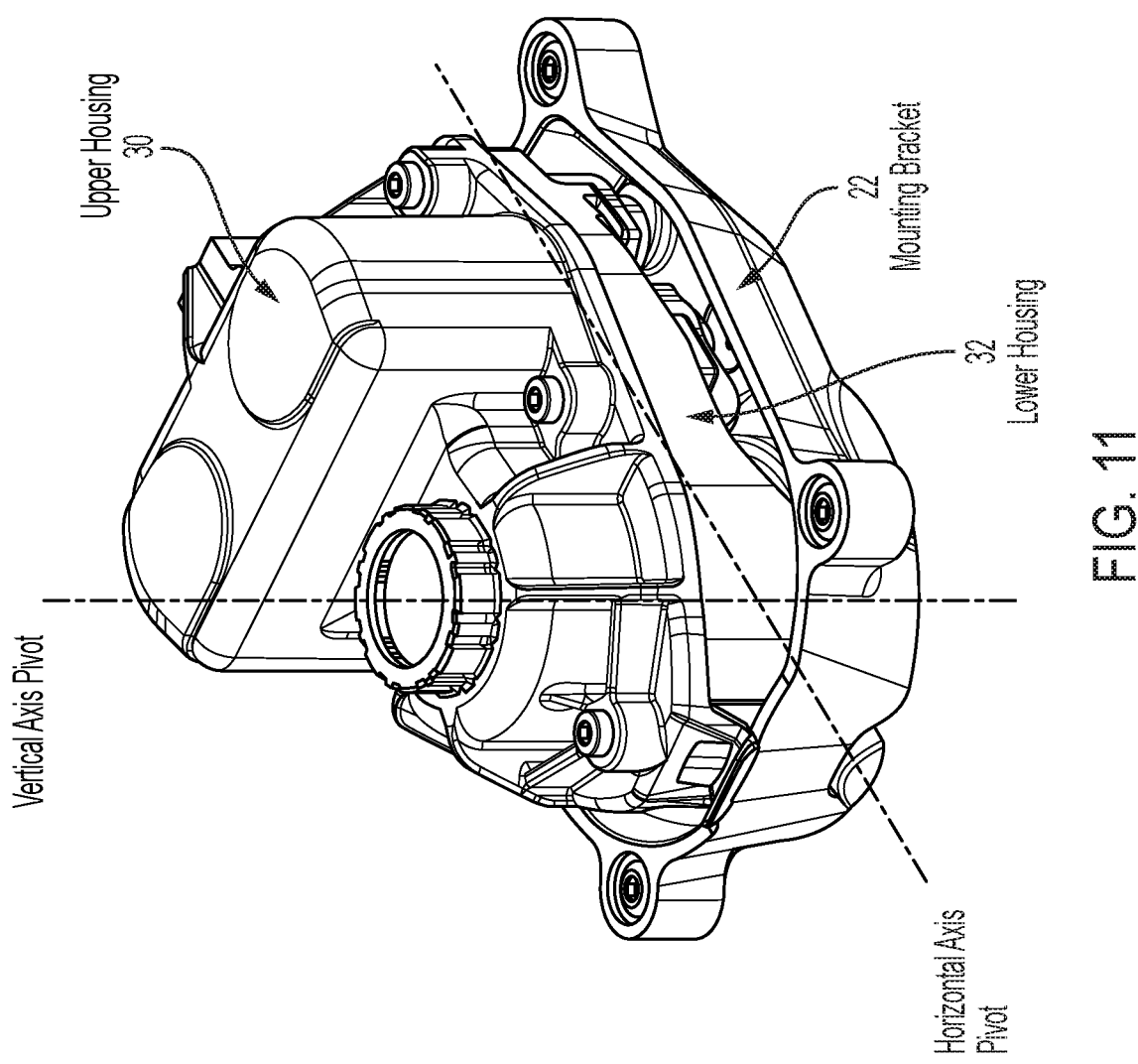
FIG. 11 is a perspective view of the actuator and mounting bracket, showing the horizontal and vertical pivot axes.
Figures 12A, 12B, 12C:
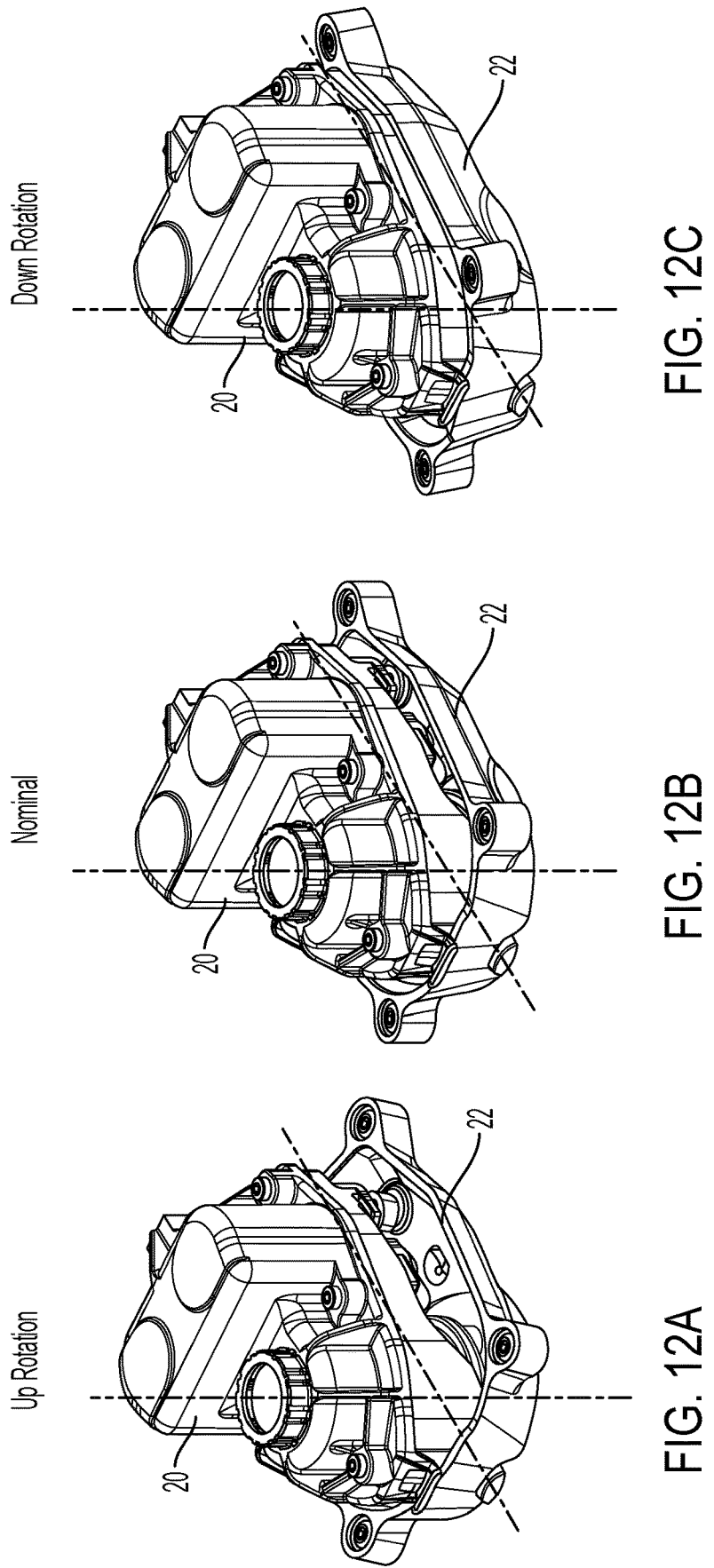
FIGS. 12A-12C are perspective views of the actuator and mounting bracket with the mounting bracket pivoted relative to the actuator between positions about the horizontal pivot axis.
Figures 13A, 13B, 13C:
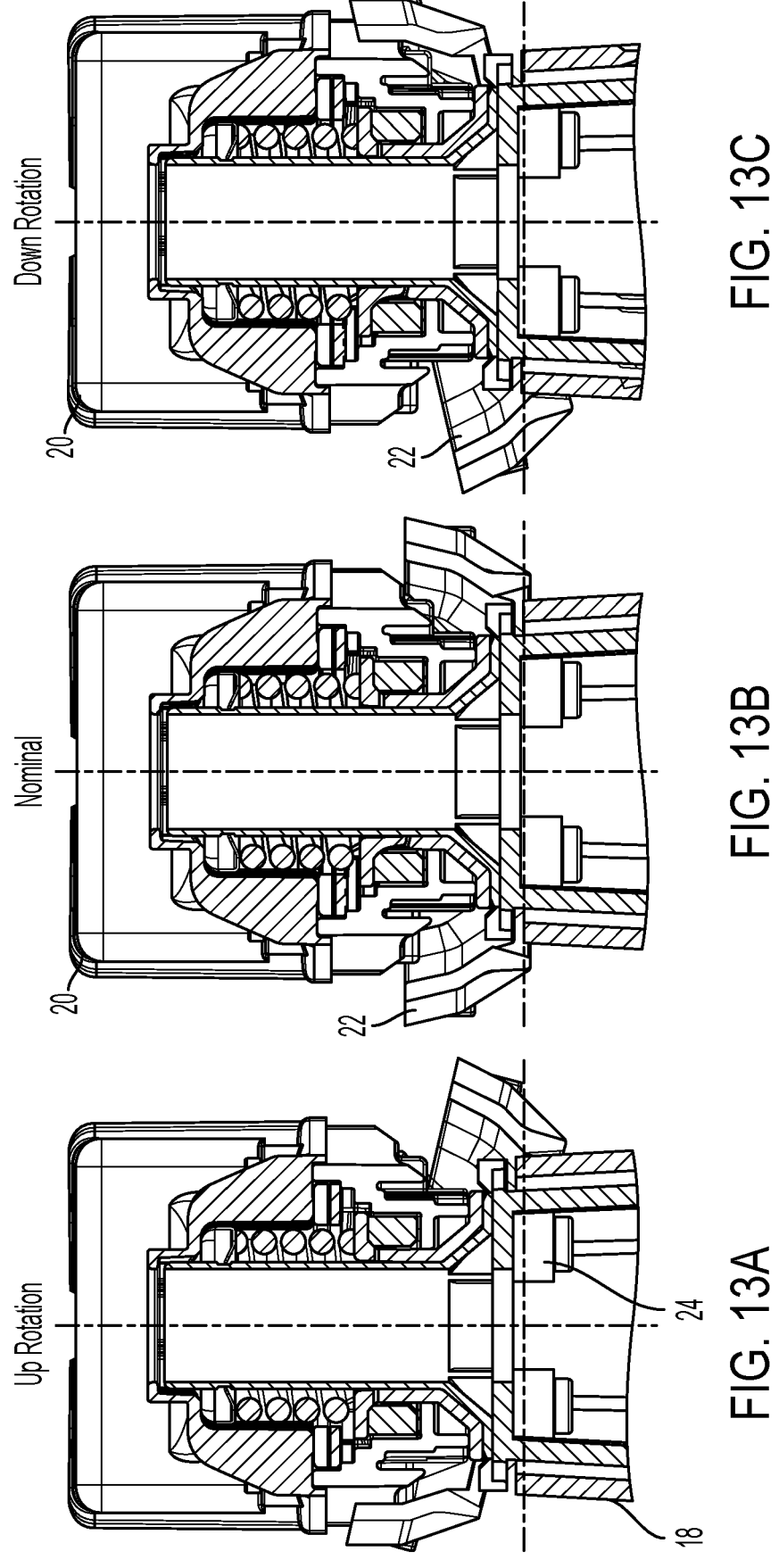
FIGS. 13A-13C are cross-sectional views of the actuator and mounting bracket with the mounting bracket pivoted relative to the actuator between positions about the horizontal pivot axis.
Figures 14A, 14B, 14C:
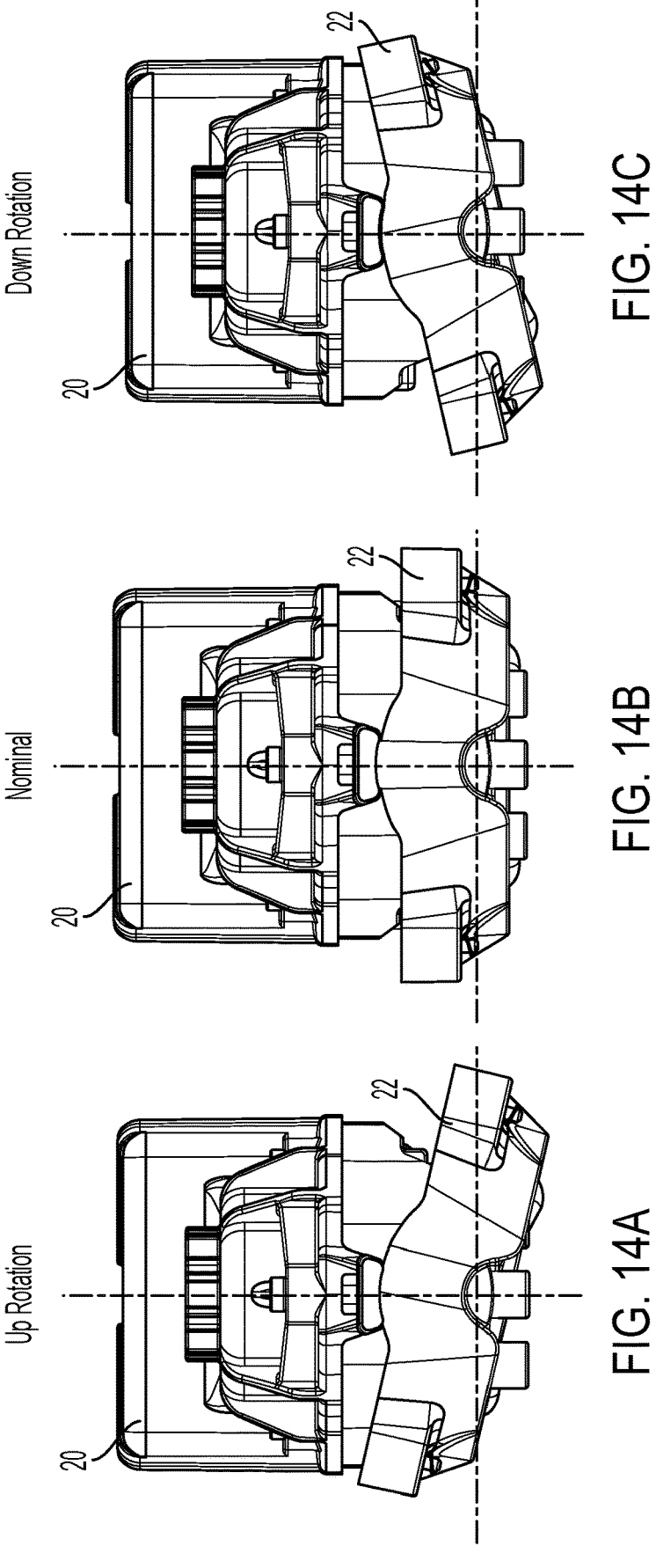
FIGS. 14A-14C are side views of the actuator and mounting bracket with the mounting bracket pivoted relative to the actuator between positions about the horizontal axis.
Figures 15A, 15B, 15C:
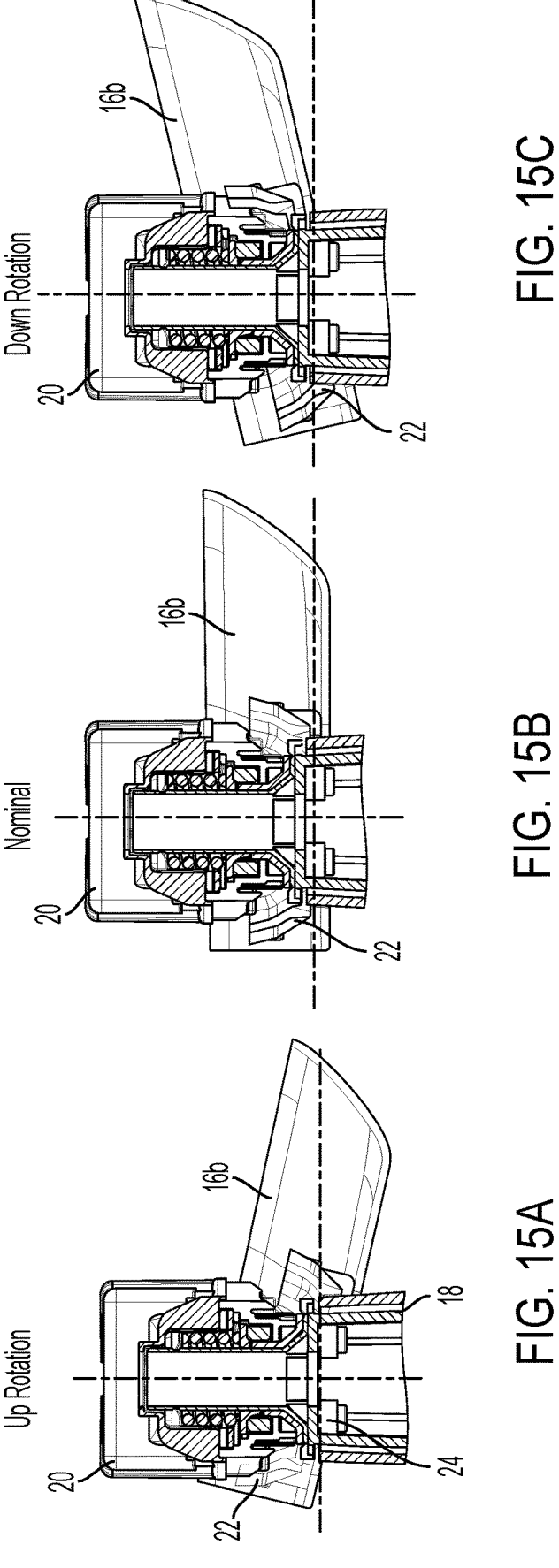
FIGS. 15A-15C are cross-sectional views of the actuator, mounting bracket, and lower portion of the mirror casing with the mounting bracket and lower portion of the mirror casing pivoted relative to the actuator between positions about the horizontal pivot axis.

As shown in FIGS. 6-11, the two motor actuator 20 utilizes a first motor 26 (i.e., the horizontal rotation motor) for horizontal mirror head 12 (including mirror casing 16 and mirror reflective element 14) rotation and a second motor 28 (i.e., the vertical rotation motor) for vertical mirror head rotation. In other words, the first motor 26, when electrically operated, imparts horizontal rotation of the mounting bracket 22 and mirror head 12 relative to the actuator 20 about the vertical pivot axis and the second motor 28, when electrically operated, imparts vertical rotation of the actuator 20, mounting bracket 22, and mirror head 12 relative to the mounting arm 18 about the horizontal pivot axis. The mirror head 12 is attached at the actuator 20 via the mounting bracket 22. The actuator 20 is attached at the mounting arm 18 via the vertical adapter plate 24. The actuator 20 comprises an upper housing 30 and a lower housing 32, which join together to house the first motor 26 and the second motor 28 and respective associated gear trains 34*a*, 34*b*. The first motor 26, via one or more gears (i.e., the gear train 34*a*), engages a horizontal pivot main or output gear 36 and causes rotational movement of the horizontal pivot output gear 36 to pivot the mirror head 12 about the horizontal pivot axis. The second motor 28, via one or more gears (i.e., the gear train 34*b*), engages a vertical pivot main or output gear 38 and imparts a rotational force on the vertical pivot output gear 38 to pivot the mirror head 12 about the vertical pivot axis. In the illustrated embodiment, the motors 26, 28 are generally vertically oriented so that their output shafts are generally vertical and parallel to one another, with the respective gear trains 34*a*, 34*b* functioning to provide the desired rotational output for engaging the horizontal pivot main gear 36 and the vertical pivot output gear 38 to pivot the mirror head about the respective axis. Optionally, the motors 26, 28 and respective gear trains 34*a*, 34*b* may be oriented in any suitable manner relative to one another (for example, the motors may be horizontal and parallel to one another or perpendicular to one another) based on, for example, space constraints defined by the mirror casing 16. As shown in FIGS. 8-10, the gear trains 34*a*, 34*b* are mounted or retained relative to the motors and gears 36, 38 via a gear train retainer 40 of the actuator. The gear train retainer 40 may be a singular or unitary plastic element retaining the motors and all gears of the respective gear trains to maintain proper mating characteristics between the components. That is, the gear train retainer 40 may secure gears of the gear trains 34*a*, 34*b* relative to one another and the respective motors 26, 28 so that rotational movement imparted by the motors 26, 28 on the respective gears of the gear trains 34*a*, 34*b* may result in the desired rotational movement of the mirror head 12.

The horizontal pivot main gear 36 engages a horizontal pivot memory gear or arcuate toothed element or arcuate gear element 42 via a horizontal pivot clutch gear 44, with the horizontal pivot memory gear 42 fixed relative to the mounting bracket 22 so that as the horizontal pivot memory gear 42 pivots or rotates relative to the horizontal pivot clutch gear 44, the mounting bracket pivots about the horizontal pivot axis. In other words, the first motor 26 rotates the horizontal pivot main gear 36 which, directly or indirectly, rotates the horizontal pivot clutch gear 44. As the horizontal pivot clutch gear 44 rotates, the horizontal pivot memory gear travels about the horizontal pivot clutch gear 44 to pivot the mounting bracket 22. Because the mounting bracket 22 is fixed to the lower housing 16*b* and the actuator is attached to the mounting arm 18 via the vertical adapter plate 24, the mirror head 12 pivots about the horizontal pivot axis while the actuator remains stationary. Thus, the actuator operates to pivot the mirror head about the horizontal axis relative to the actuator.

The horizontal pivot axis is generally horizontal with the exterior rearview mirror assembly mounted at the side of the equipped vehicle and may extend generally laterally across the vehicle, such as in a direction generally normal to a longitudinal axis of the vehicle, and/or may extend generally parallel to the generally planar surface of the mirror reflective element. Thus, when the mirror head 12 is pivoted about the horizontal axis, the mirror reflective element 14 may be tilted upward or downward (i.e., toward facing a ground surface or away from facing the ground surface). The vertical pivot axis may be vertical or tilted or canted, such as tilted or canted 10 degrees or more (such as 15 degrees) from vertical as defined by the mounting of the mirror head 12 at the mirror base 18 at the side of the vehicle. Thus, when the mirror head 12 is pivoted about the vertical pivot axis, the mirror reflective element 14 may be tilted inward or outward (i.e., toward facing the side of the vehicle or away from facing the side of the vehicle).

Figure 7:
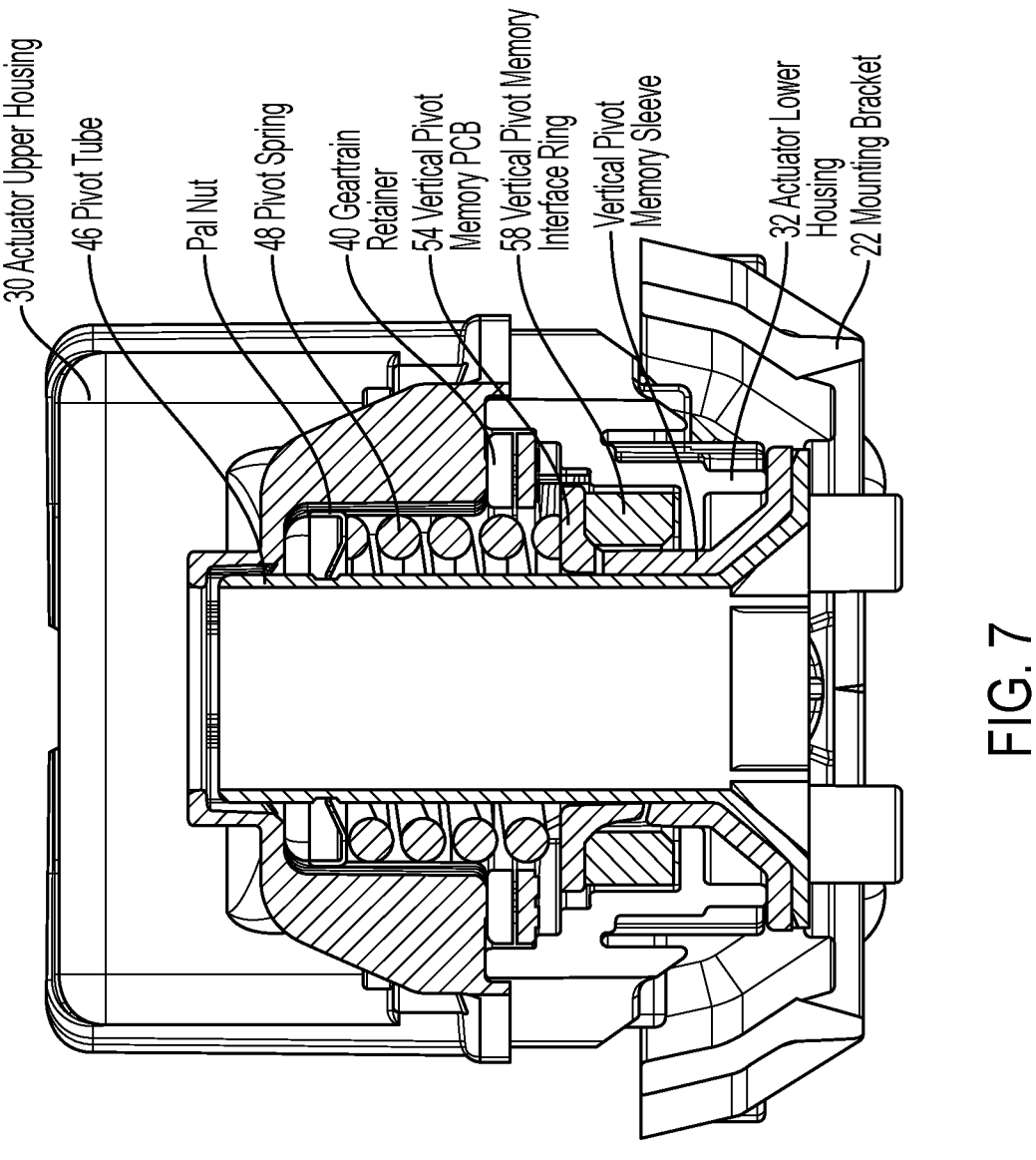
FIG. 7 is a cross-sectional view of an actuator showing components of the actuator that enable the actuator to be operable to pivot the mirror head about a vertical pivot axis.

As shown in FIG. 7, the second or vertical pivot motor 28 is operable to pivot the mirror head 12 about the vertical pivot axis via the gear train 34*b* engaging the vertical pivot output gear 38. The vertical pivot output gear 38 may be oriented around a pivot tube 46 of the actuator with the pivot tube 46 defining the vertical pivot axis of the actuator 20 and mirror head 12. The pivot tube 46 and/or vertical pivot output gear 38 may be fixed relative to one another and relative to the mounting arm or mirror base 18 so that as the second motor 28 is electrically operated to rotate the gear train 34*b* engaging the vertical pivot output gear 38, the actuator travels about the vertical pivot output gear 38 and/or pivots about the pivot tube 46. The vertical pivot output gear 38 may be an integrally formed portion of the pivot tube 46. Because the lower housing 32 of the actuator is constrained to the mounting bracket 22, as the actuator 20 pivots about the vertical pivot axis, the mirror head 12 via the attachment of the mirror casing 16 and mounting bracket 22 also pivots about the vertical pivot axis. Thus, when the actuator 20 is operated to pivot the mirror head 12 about the vertical pivot axis, the mirror head and actuator pivot together and in tandem.

The actuator 20 also includes an internal pivot spring 48 disposed between a palnut or upper portion or top surface of the upper housing 30 and the lower housing 32. The internal pivot spring provides a biasing force between components within the actuator to maintain friction and engagement between the gears and motors of the actuator.

Thus, the actuator is operable to pivot the mirror head about the horizontal and vertical pivot axes via independent operation of the respective horizontal and vertical pivot motors 26, 28 (which may receive commands to pivot the mirror head in any suitable fashion such as via signals received at an electrical interface PCB in electrical connection at the actuator). The actuator pivots the mirror head relative to the actuator about the horizontal pivot axis and pivots the mirror head via pivoting of the actuator about the vertical pivot axis that is translated to pivoting of the mirror head about the vertical pivot axis. Thus, operation of the motors individually provides the respective horizontal or vertical pivoting of the mirror head relative to the mounting arm. Optionally, the motors may be cooperatively operable in tandem to simultaneously pivot the mirror head about the horizontal and vertical pivot axes. That is, the motors 26, 28 may be operated at the same time to pivot the mirror head 12 about both the horizontal pivot axis and the vertical pivot axis at the same time. The gear trains include respective clutches to allow for manual override so that the mirror head may be manually pivoted about the vertical and horizontal pivot axes.

For example, and as shown in FIG. 9, the horizontal gear train 34*a* includes the horizontal pivot clutch gear 44 that engages the arcuate element 42 for pivoting the mounting bracket 22 and mirror head relative to the actuator housing and mounting arm 18. When the mirror head is manually pivoted about the horizontal pivot axis, a first portion 44*a* of the horizontal pivot clutch gear 44 that engages the arcuate element 42 rotates so as to allow the arcuate element 42 to move relative to the clutch gear 44 as the mirror head pivots, and a second portion 44*b* of the horizontal pivot clutch gear 44 that engages the horizontal gear train 34*a* does not rotate to prevent the manual force from acting on the motor 26. For example, responsive to a threshold force applied to the mirror head, the two portions of the horizontal pivot clutch gear 44 may rotatably separate from one another. As discussed below, the vertical pivot output gear may similarly preclude or reduce manual forces acting on the motor 28. For example, the vertical pivot output gear may be biased into engagement with a worm gear of the vertical gear train 34*b* when the motor 28 is not being electrically powered such that the worm gear (and therefore the upstream vertical gear train between the worm gear and motor) is rotatably fixed via the engagement with the vertical pivot output gear. This may reduce free play or backlash when the vertical pivot motor is not operated. Optionally, the worm gear may be rotatably separable from the upstream vertical gear train to allow the mirror head to pivot about the vertical pivot axis responsive to manual forces without transferring the manual forces through the vertical gear train 34*b* to the motor 28. When the motors are operated (independently or cooperatively), the mirror head can be pivoted to any desired orientation within the limits of the horizontal pivoting and vertical pivoting.

Figures 16A, 16B, 16C:
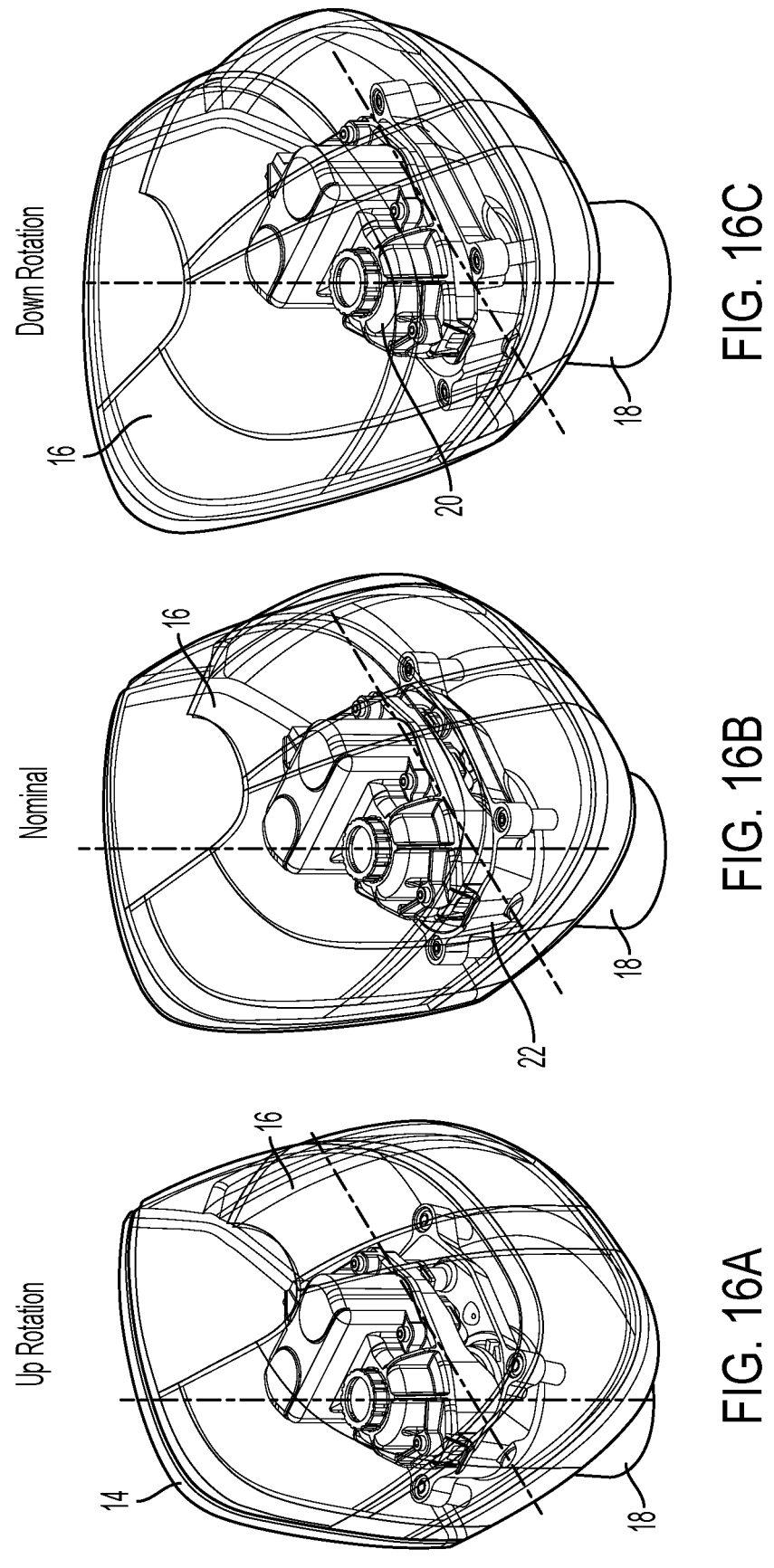
FIGS. 16A-16C are perspective views of the exterior rearview mirror assembly with the mirror head pivoted relative to the actuator between positions about the horizontal pivot axis.

For example, as shown in FIGS. 12A-16C, the mounting bracket 22 (and thus the mirror head) is pivotable about the horizontal pivot axis relative to a nominal position (FIGS. 12B, 13B, 14B, 15B, and 16B) between an up rotation position (FIGS. 12A, 13A, 14A, 15A, and 16A) where the mirror reflective element is tilted upward (FIG. 16A) and a down rotation position (FIGS. 12C, 13C, 14C, 15C, and 16C) where the mirror reflective 14 element is tilted downward (FIG. 16C). The actuator 20 is operable to pivot the mirror head 12 equally in the upward or downward rotation direction, such as, for example, ±13 degrees, but may be configured to pivot the mirror head more or less in a desired direction. Accordingly, the gap in the lower housing 16*b* accommodating the mirror base 18 may be sized based on the pivoting range of the mirror head 12 relative to the mirror base 18. As shown, the actuator 20 remains stationary relative to the mirror base 18 when the mounting bracket 22 and mirror head 12 are pivoted about the horizontal pivot axis.

The actuator 20 may also provide a horizontal pivot memory element or function and a vertical pivot memory element or function that are electronically operable to record and store the position of the mirror head 12 about the respective horizontal and vertical axes and compare a current position of the mirror head 12 to a recorded or stored position, so that if the mirror head 12 is not positioned at its stored position, the actuator 20 may be operated to return the mirror head 12 to its previous or stored position. For example, the memory elements may detect, record and store the position of the mirror head 12 (corresponding to an orientation of the mirror reflective element) for a determined driver identity of the vehicle and the actuator 20 may be operable (such as upon user input or recognition of the identity of the driver of the vehicle) to pivot the mirror head 12 about the horizontal and/or vertical axes to return the mirror head 12 to the stored position. The horizontal and vertical pivot memory elements may comprise circuit elements or printed circuit boards (PCBs) with memory traces that are in contact with electrical contacts or memory wipers that together detect pivoting of the mirror head 12 about the vertical and horizontal pivot axes. The memory elements may utilize aspects of the memory features described in U.S. Publication No. US-2021-0323477, which is hereby incorporated herein by reference in its entirety.

Figures 17A, 17B, 17C:
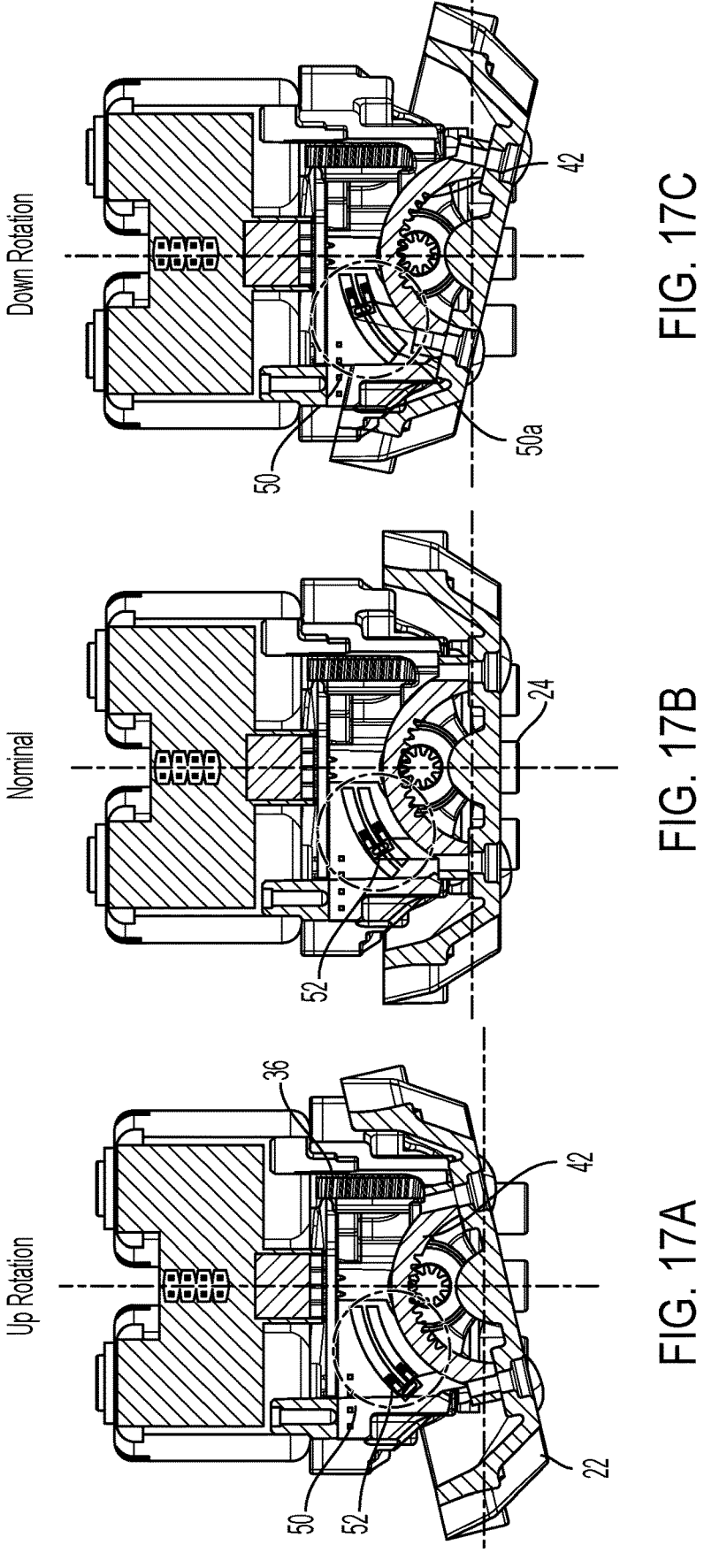
FIGS. 17A-17C are cross-sectional views of the actuator and mounting bracket with the mounting bracket pivoted relative to the actuator between positions about the horizontal axis, showing the horizontal pivot memory function of the exterior rearview mirror assembly.

As shown in FIGS. 17A-17C, the horizontal pivot memory element includes a horizontal pivot PCB 50 and a horizontal pivot wiper or wipers 52 attached to the horizontal pivot memory output gear 42 that slidably engage one or more corresponding memory traces 50*a* of the PCB 50.

Thus, as the horizontal pivot memory output gear 42 pivots with the mounting bracket 22 (and therefore mirror head) relative to the actuator 20, the wipers 52 slidably engage the memory traces 50*a* and the PCB 50 detects a position of the electrical contact of the wipers along the traces to determine the position of the mirror head about the horizontal axis. In the illustrated embodiment, the horizontal pivot PCB 50 is fixed relative to the actuator 20 and the horizontal pivot wipers 52 pivot with the horizontal pivot memory output gear 42. Thus, the horizontal pivot traces 50*a* are configured to accommodate the range of travel of the wipers 52 as the mirror head pivots between the up rotation position (FIG. 17A) and the down rotation position (FIG. 17C) so that the horizontal pivot memory function may detect the mirror head position at any pivot position as the mirror head pivots about the horizontal axis.

Figure 18:
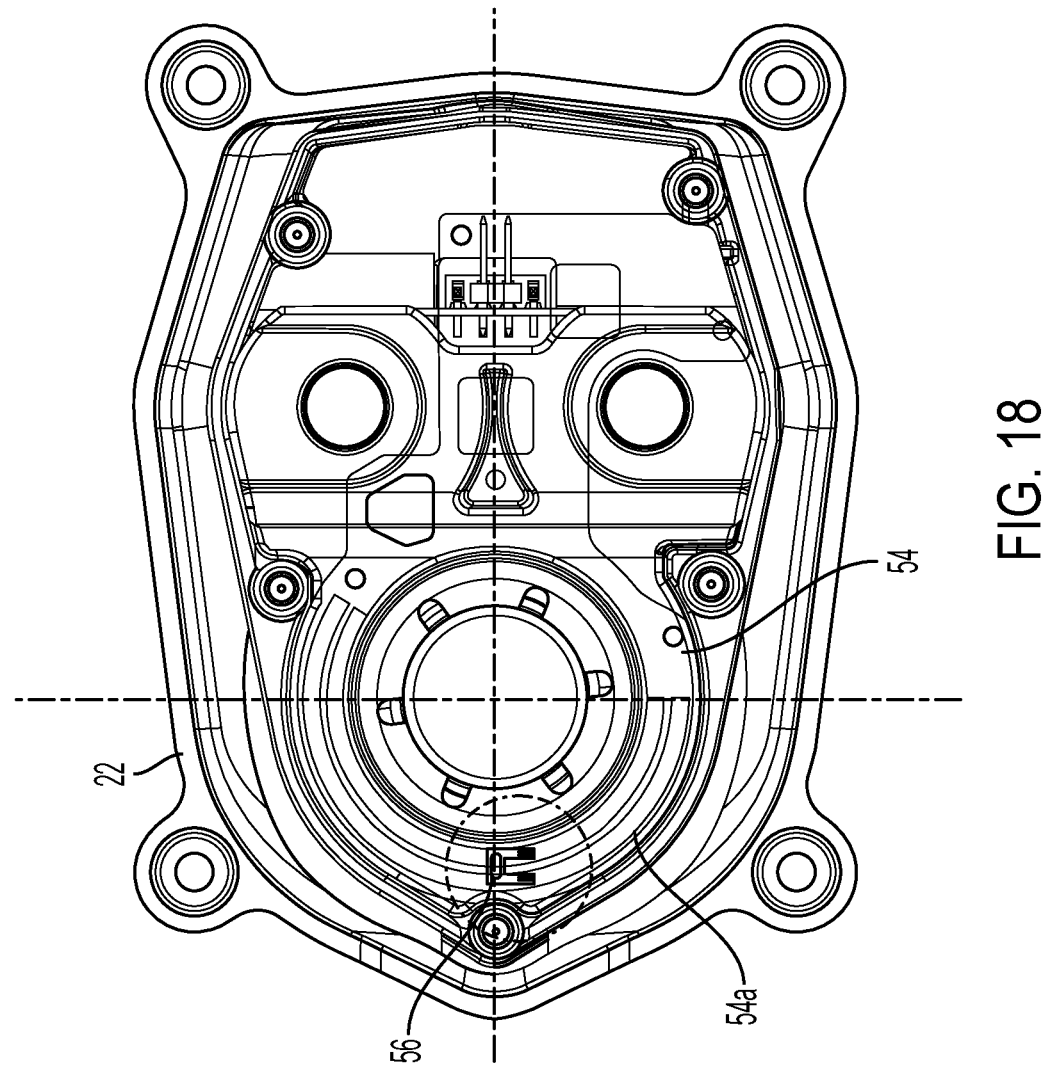
FIG. 18 is a top view of the mounting bracket and lower housing of the actuator, showing the vertical pivot memory function of the exterior rearview mirror assembly.

As shown in FIG. 18, a vertical pivot memory PCB 54 is disposed at the gear train retainer 40 and one or more vertical pivot memory wipers 56 are fixed relative to the vertical pivot output gear 38, such as at a vertical pivot memory interface ring 58, so that as the actuator pivots about the pivot tube 46 and relative to the fixed vertical pivot output gear 38, the wipers 56 remain stationary and the vertical pivot memory PCB 54 pivots with the actuator so that the wipers slidably engage the vertical pivot memory traces 54*a* at the vertical pivot memory PCB 54. The vertical pivot memory PCB 54 detects the position of the electrical contact of the wipers 56 along the traces 54*a* to determine the position of the mirror head 12 about the vertical pivot axis.

Figures 19A, 19B, 19C:
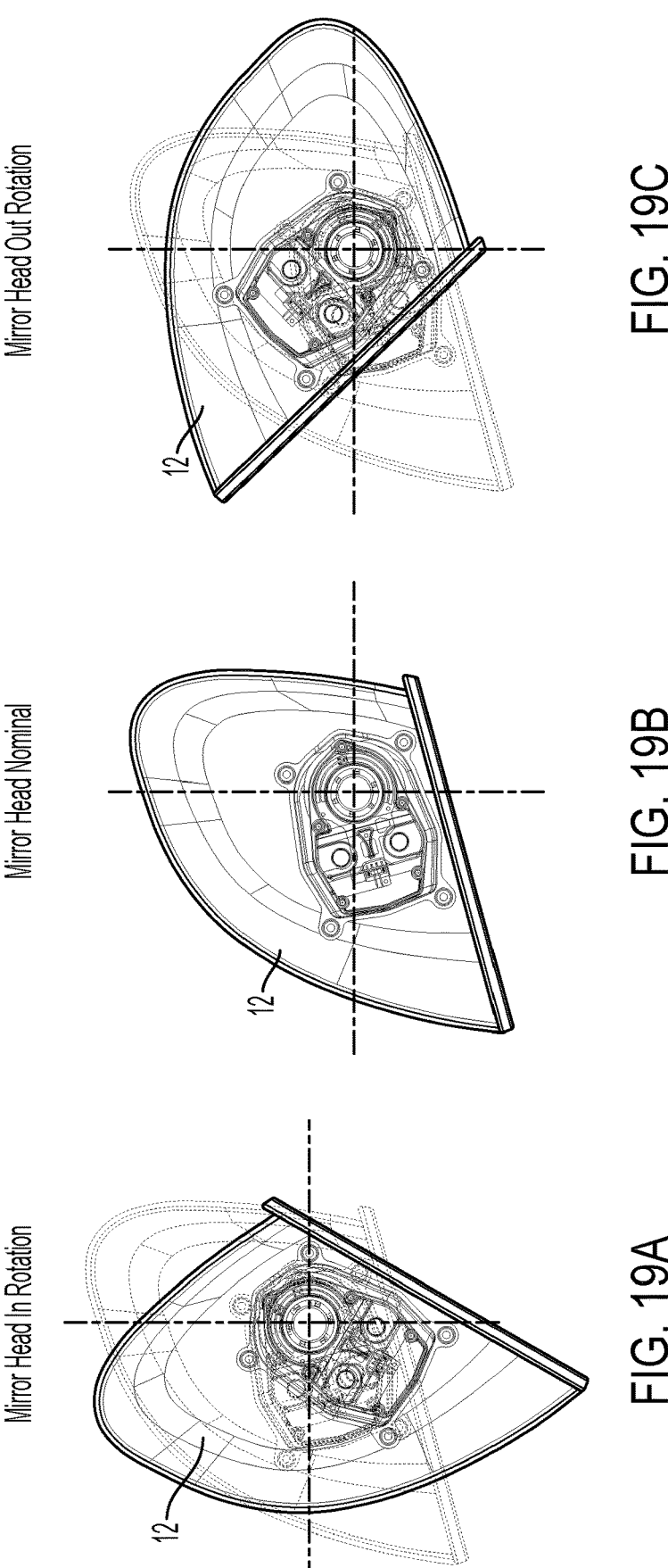
FIGS. 19A-19C are top views of the exterior rearview mirror assembly with the mirror head and actuator pivoted relative to the mirror base between positions about the vertical pivot axis.
Figures 20A, 20B, 20C:
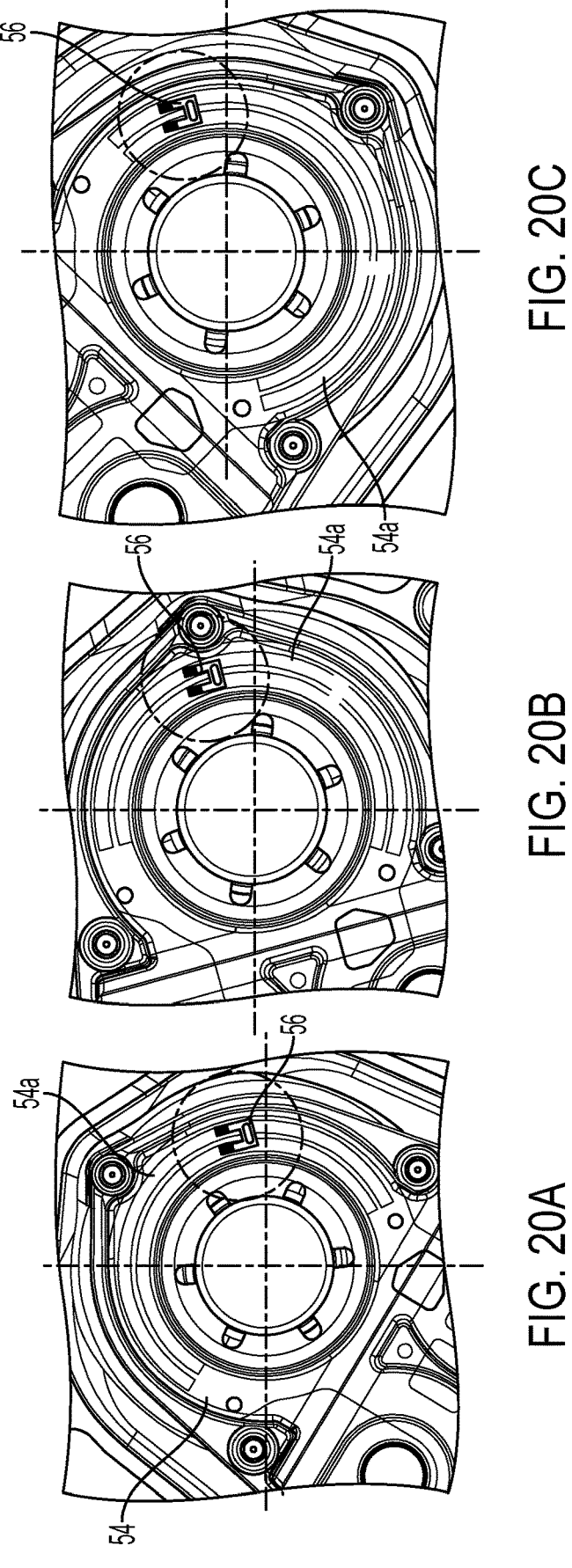
FIGS. 20A-20C are enlarged partial views of the vertical pivot memory function at the respective positions of the mirror head about the vertical pivot axis of FIGS. 19A-19C.

As shown in FIGS. 19A-20C, the mirror head 12 and actuator 20 are pivotable about the vertical pivot axis relative to a nominal position (FIGS. 19B and 20B) between a mirror head in rotation position (FIGS. 19A and 20A) and a mirror head out rotation position (FIGS. 19C and 20C). The mirror head in rotation position may correspond to the folded or non-use position of the mirror head 12 and the mirror head out rotation position may correspond to the forward fold position of the mirror head 12. The vertical pivot wipers 56 remain stationary relative to the vertical axis and the vertical pivot memory PCB 54 pivots about the vertical axis with the actuator 20 so that the wipers may move along the traces 54*a*. The vertical pivot memory traces 54*a* are configured to accommodate the full range of motion of the mirror head 12 about the vertical pivot axis (including the forward fold position) so as to detect the position of the mirror head 12 at any position about the vertical pivot axis. The actuator 20 is operable to pivot the mirror head 12 equally about the vertical pivot axis relative to the nominal position, such as, for example, ±70 degrees, but may be configured to pivot the mirror head 12 more or less in a desired direction.

Optionally, the horizontal pivot memory function and the vertical pivot memory function may only record the position of the mirror head 12 when the mirror head 12 is pivoted to a position via electrical operation of the actuator 20 so that, if the mirror head 12 is manually pivoted to a position, the memory function does not record that position of the mirror head in memory. For example, the horizontal pivot memory PCB and the vertical pivot memory PCB may only be electrically powered for recording position of the respective memory wipers when the actuator is being electrically operated. Thus, after the mirror head 12 is manually pivoted to a given position, the actuator may be electrically operated to pivot the mirror head to the previously stored position, which may be the position of the mirror head 12 immediately prior to being manually moved.

Figures 21A, 21B, 21C:
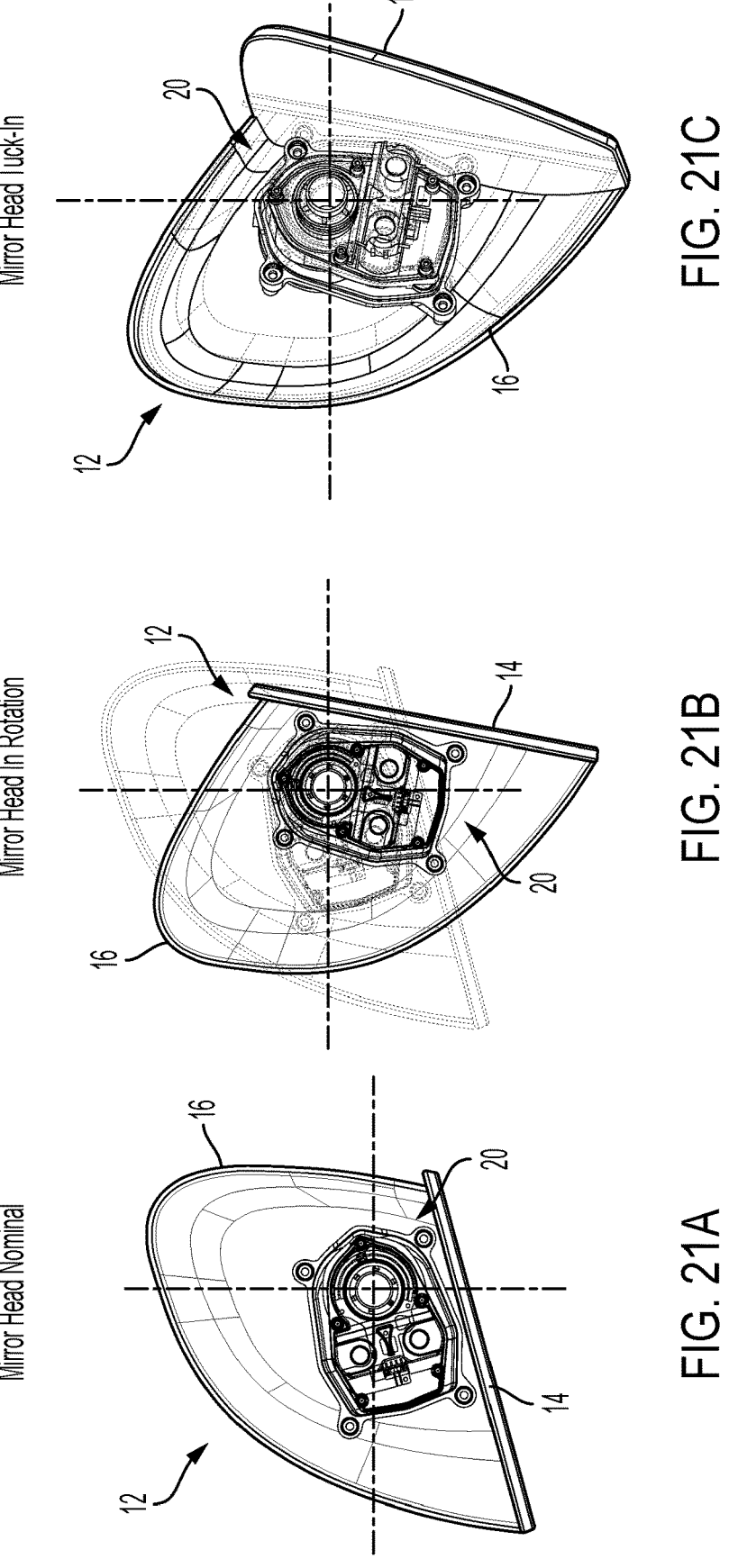
FIGS. 21A-21C are top views of the exterior rearview mirror assembly with the mirror head and actuator pivoted relative to the mirror base between positions about the vertical pivot axis and the horizontal pivot axis.

Optionally, the mirror assembly may provide a tuck-in feature, where the mirror head 12 is pivotable between a nominal or use position (FIG. 21A), a folded position (FIG. 21B) where the mirror head is pivoted toward the side of the vehicle so that the mirror reflective element is facing the side of the vehicle, and a tuck position (FIG. 21C), where, with the mirror head 12 in the folded position, the actuator 20 pivots the mirror head 12 about the horizontal axis to tilt the mirror head 12 downward and further inward toward the side of the vehicle. The tuck-in position is an optional final position or step of the powerfold motion. For example, the mirror head 12 may be in the use position and upon a user input, may pivot toward the folded position or the tuck position. For example, after the actuator 20 and mirror head 12 pivot about the vertical axis from the use position to the folded position, the actuator pivots the mirror head about the horizontal axis to the tuck position. This may provide additional protection to the mirror head and mirror reflective element from impacts, debris, and other damage.

As discussed above, actuator rotation about the vertical axis is used for both power folding and left-right glass adjustment functions. In other words, the powerfold actuator 20 may be operated to pivot the mirror head 12 between the folded and use positions and may be operated to pivot the mirror head 12 to a lesser degree from the use position to adjust position of the mirror head 12 and adjust the field of view provided to the driver of the vehicle. The actuator 20 may pivot about the vertical axis at different travel speeds depending on the intended purpose of pivoting the mirror head 12. For example, the actuator 20 may pivot about the vertical axis at a faster travel speed when providing the powerfold function and at a slower adjustment speed when the mirror head 12 is in the use position and the actuator 20 is operated for adjusting the rearward view provided by the mirror reflective element 14 to the driver of the vehicle. The pivoting about the horizontal axis from the folded position to the tuck position may be performed either at a speed that is faster than the speed implemented when adjusting the horizontal rearward view (when the mirror head is in the use position) or at the same speed that is implemented when adjusting the horizontal rearward view (when the mirror head is in the use position) or at a speed that is slower than the speed implemented when adjusting the horizontal rearward view (when the mirror head is in the use position).

The actuator 20 (or a control in communication with the actuator, such as a controller of the mirror assembly or a door control module or electronic control unit of the vehicle door or of the vehicle) may determine whether to operate at the faster travel speed or the slower adjustment speed in any suitable manner. For example, if the actuator 20 is operated to pivot the mirror head 12 between the folded position (or tuck position) and the use position, the actuator 20 may be operated to pivot the mirror head 12 at the powerfold travel speed, and if the actuator 20 is operated to adjust the mirror head 12 in the use position, the actuator 20 may pivot the mirror head 12 at the rearward view adjustment speed. If the mirror head 12 is at a starting position (such as at the folded position or another use position) and the actuator 20 is operated to pivot the mirror head 12 to a stored memory recall position of the use position (such as responsive to a user input), the actuator 20 may be operated to pivot the mirror head 12 from the starting position to the memory recall position at the powerfold travel speed.

Figure 22:
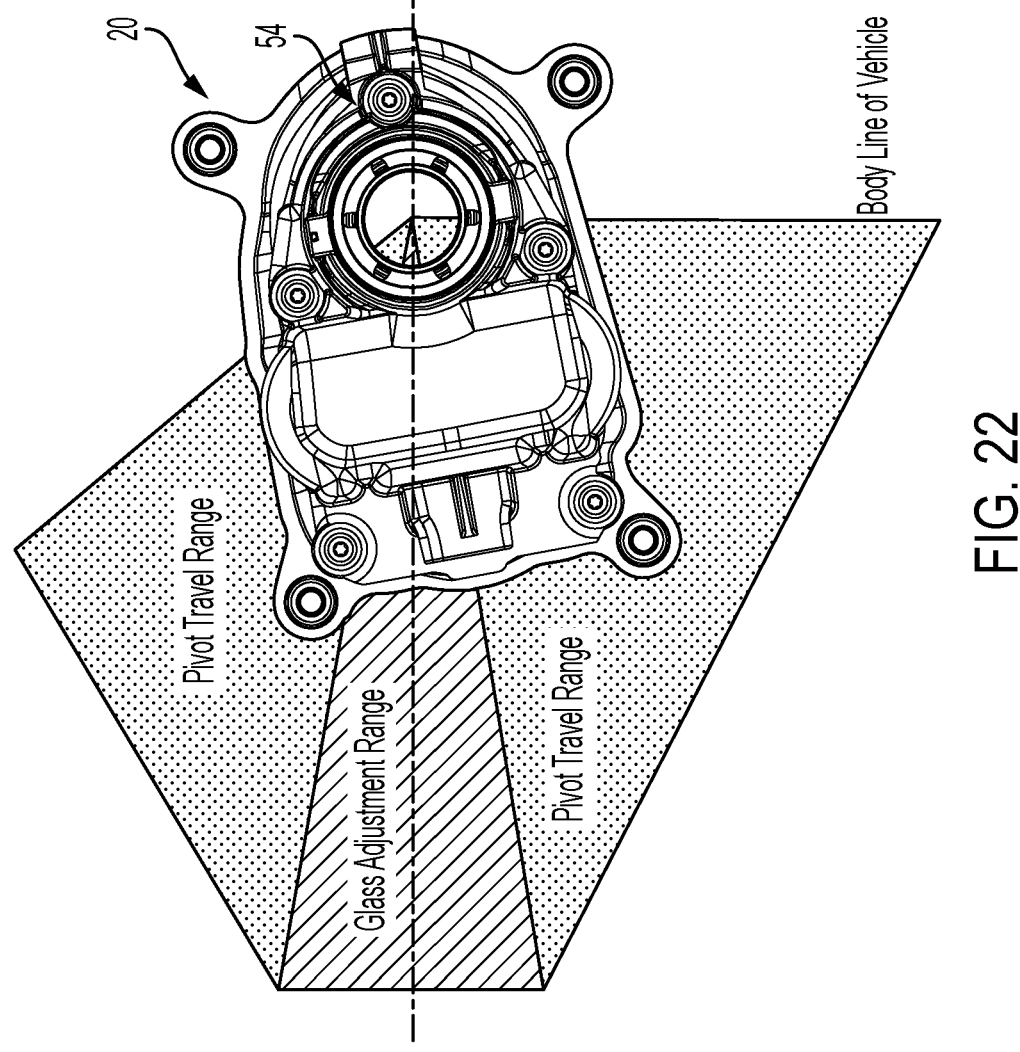
FIG. 22 is a plan view of the actuator and mounting bracket, showing portions of the range of travel of the mirror head and actuator.
Figures 23, 24, 25:
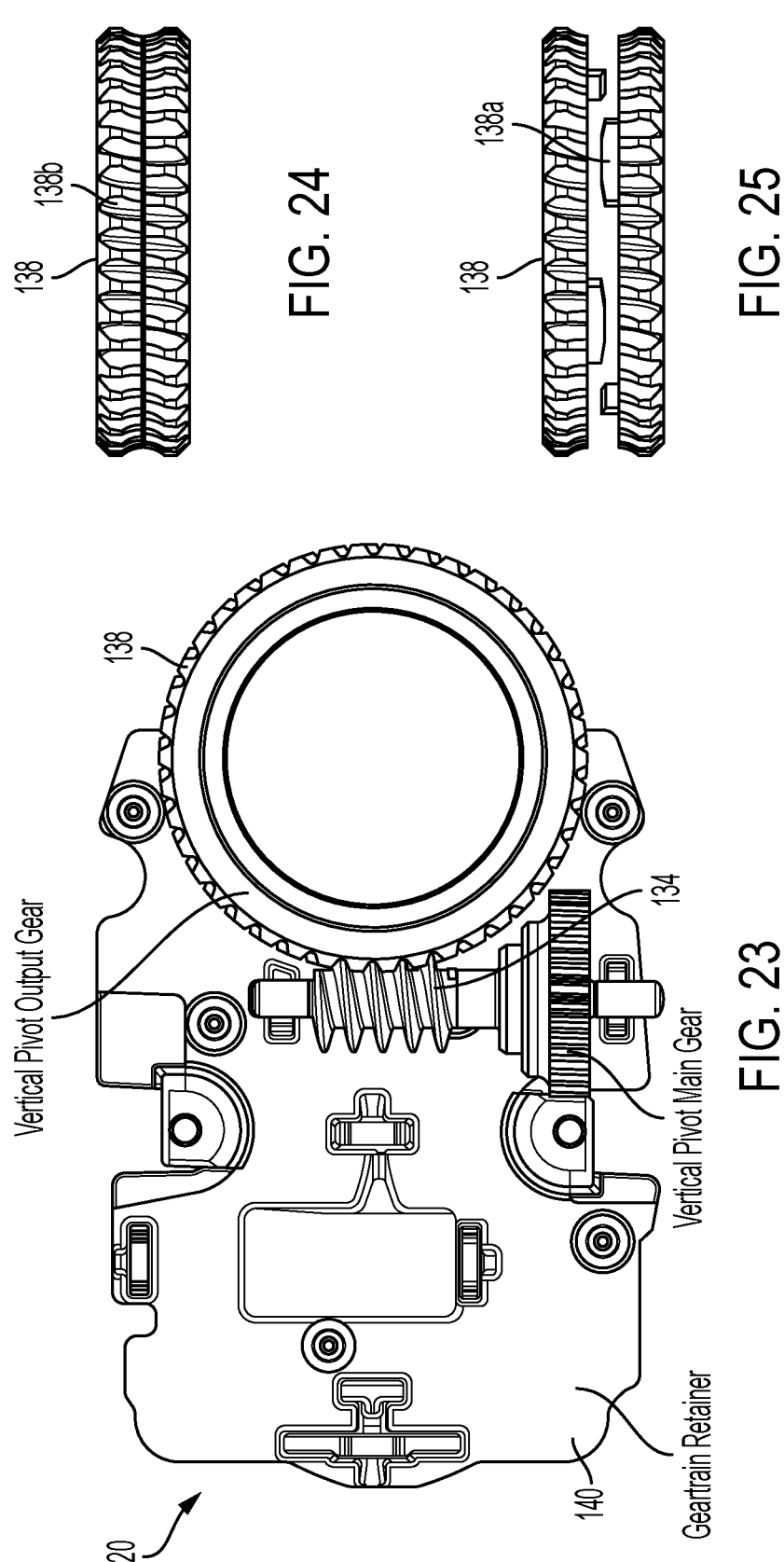
FIG. 23 is a top view of the gear retainer of an actuator having a two-piece output gear.
FIGS. 24-29 are views of the two-piece output gear of FIG. 23.
Figures 26, 27, 28, 29:
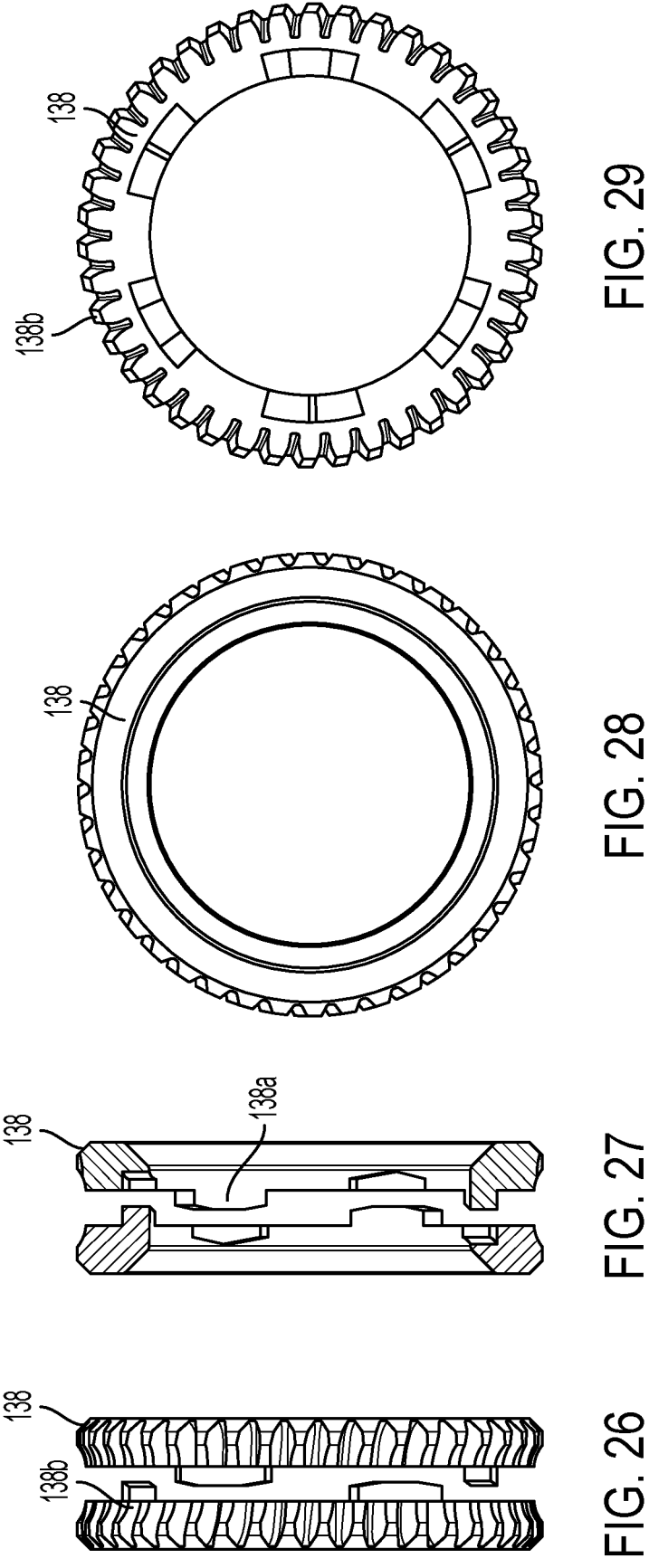

The actuator 20 may be operated to pivot the mirror head 12 at a determined speed based on a radial position of the mirror head 12 about the vertical pivot axis. The position of the mirror head 12 about the vertical axis may be determined by the vertical pivot memory function, where positions of the vertical pivot wipers 56 along the vertical pivot memory traces 54a of vertical pivot memory PCB 54 correspond to positions of the mirror head 12 about the vertical pivot axis. In the illustrated embodiment of FIG. 22, the actuator 20 pivots the mirror head 12 at the powerfold travel speed when the mirror head 12 is within the areas designated as the pivot travel range and at the rearward view adjustment speed when the mirror head 12 is within the areas designated as the glass adjustment range. The glass adjustment range may correspond to the use position and the pivot travel ranges may correspond to ranges or positions between the use position and the folded position and between the use position and the forward fold position. Once the vertical pivot memory PCB 54 provides feedback that the mirror head 12 is within the rearward view adjustment range, controller logic adjusts the motor to slow down to the rearward view adjustment speed. Thus, the actuator 12 may receive an input from the vertical pivot memory PCB 54 that indicates the radial position of the mirror head 12 to determine what speed to pivot the mirror head 12 about the vertical axis. This can be accomplished by pulse width modulation (PWM) or some other means.

Optionally, the actuator may provide enhanced retention and may reduce or eliminate backlash or free play of the mirror head when in any set position at which the actuator is not powered, such as the use position or the folded position or the tuck position or the forward folded position. For example, and such as shown in FIGS. 23-29, an actuator 120 may include a two-piece enveloping helical output gear 138 to enable rotation about the vertical axis. That is, the vertical pivot gear train, when the second motor is electrically operated, imparts a rotational force on the helical output gear 138 to pivot the actuator 120 about the vertical pivot axis. The vertical pivot gear train engages the helical output gear 138 via a mating worm gear 134. When the actuator 120 is operated to pivot the mirror head about the vertical pivot axis, teeth 138b of the helical output gear 138 are aligned to allow the worm gear 134 to rotate and move along the helical output gear 138. When the actuator 120 is not being operated to pivot the mirror head about the vertical pivot axis, the teeth 138b of the helical output gear 138 are misaligned to prevent the worm gear 134 from rotating and thus the worm gear (and actuator and mirror head) are precluded from traveling along the helical output gear 138.

The helical vertical output gear 138 comprises two halves or portions that are axially movable relative to one another and that have ramped engaging surfaces 138a (see FIGS. 26 and 27) that engage one another as the gear portions are axially moved relative to one another. When the actuator 120 is in an unpowered state, a compression spring load (such as from a pivot spring of the actuator 120) forces or urges the two halves or portions of the gear 138 together, whereby the two portions of the gear self-center via engagement of ramped surfaces 138a on each half or portion. In the compressed or combined state or orientation or position, the upper and lower tooth profiles 138b of the respective halves are offset from each other (see FIG. 24). When in the combined or compressed state, the offset gear teeth contact the threads of a mating worm 134 on both sides (i.e., at both sides of a given thread of the mating worm gear), which imparts a holding effect to eliminate backlash or free play of the mirror head.

Rotation of the mating worm gear 134 (via actuation of the respective electrical motor of the actuator that imparts rotation of the vertical pivot main gear) engages the output gear to cause the actuator 120 to travel about the vertical pivot axis. For example, the output gear 138 may be fixed relative to a pivot tube of the actuator 120, such that, when the actuator is electrically operated, operation of the electrical motor imparts rotation of the mating worm gear 134 engaging the fixed output gear 138 so that the actuator may travel about the fixed output gear. Optionally, rotation of the mating worm gear may impart rotation of the output gear to pivot the actuator and mirror head about the vertical pivot axis.

When the actuator 120 is electrically operated to pivot the mirror head about the vertical axis, the halves or portions of the helical output gear 138 separate to move the respective teeth 138b into an aligned state, allowing full-contact mesh action with the worm gear 134. In other words, when the worm gear 134 is rotated, one side of the worm gear teeth will urge the rotation of the output gear 138 relative to the worm gear 134, which causes one of the gear portions (e.g., one of the halves or portions of the helical output gear 138) to separate from the other (against the spring force) until the gear teeth 138b of the two portions of the output gear 138 are aligned and the two portions are in a separated or extended or expanded position or state or orientation (see FIG. 26). The output gear portions may be rotationally fixed relative to one another (and/or relative to the pivot tube) so that the teeth of the two portions may remain aligned when in the expanded state (via the ramped protrusions/recesses 138a and/or via the engagement of the helical worm gear 134 with the teeth of the separated output gear portions).

Thus, when the actuator 120 is not operated, the two portions of the helical output gear 138 are forced or urged toward one another (FIG. 24), and optionally engage one another, by the compression spring load, which prevents rotation of the mating worm gear 134 via engagement of the offset or misaligned gear teeth 138b with the helical worm gear 134. When the actuator 120 is operated, the two portions of the output gear 138 separate (FIG. 25) as one side of the helical worm gear teeth engage and act on one side of the output gear teeth 138b, which causes separation of the output gear portions until the output gear teeth 138b are aligned. The output gear portions may be guided together (when the actuator is unpowered) via the ramped interfaces 138a and optionally may rotate relative to one another. The helical output gear 138 and mating worm gear 134 may be retained by a gear train retainer 140 of the actuator 120. The actuator 120 is otherwise similar to the actuator 20 described above, such that a detailed discussion of the actuators need not be repeated herein.

Thus, the vehicular exterior rearview mirror assembly provides a mirror head having a mirror reflective element fixed relative to a mirror casing, the mirror casing encasing or housing an actuator operable to pivot the mirror head (and therefore the mirror casing and mirror reflective element together and in tandem) about vertical and horizontal axes via operation of two motors. The actuator, when operated to pivot the mirror head about the horizontal axis, remains stationary or fixed relative to a mounting base of the mirror assembly and a mounting bracket attached to the actuator and the mirror casing is pivoted about the horizontal axis via operation of the actuator to pivot the mirror head with the actuator about the horizontal axis. The actuator is constrained about the vertical axis by the mounting bracket and thus, when the actuator is operated to pivot the mirror head about the vertical axis, the actuator pivots with the mirror head and the mounting bracket relative to the mounting base of the mirror assembly. The actuator provides a horizontal pivot memory function and a vertical pivot memory function via electrical contact between respective horizontal and vertical pivot memory wipers and memory PCBs to detect the position of the mirror head about the horizontal and vertical axes. The actuator includes an internal spring to maintain friction and/or engagement between the motors and the respective horizontal and vertical output gears.

Optionally, a vertical output gear is fixed relative to the vertical pivot axis of the mirror head so that, when one of the motors is electrically operated to pivot the actuator and mirror head about the vertical pivot axis, a gear train engages the vertical output gear and the actuator travels about the vertical output gear. The vertical output gear may include two portions, each portion including gear teeth. When the actuator is not pivoting the mirror head about the vertical pivot axis, the two portions may be biased toward engagement with one another so that the teeth of the respective portions are misaligned, restricting movement of the engaged gear train and thus restricting or precluding movement of the mirror head and actuator about the vertical pivot axis. When the actuator is operated to pivot the mirror head about the vertical pivot axis, the two portions are moved against the biasing force away from engagement with one another so that the teeth of the respective portions are aligned and the actuator may move about the vertical output gear via rotational movement of the gear train engaging the vertical output gear.

The mirror assembly allows for inclusion of other accessories (such as turn signal indicators, blind spot indicators, lights, displays and/or the like) in the mirror head, without concerns of interference with conventional actuators disposed in the mirror head and at and behind the mirror reflective element. The exterior rearview mirror assembly and/or actuators may utilize aspects of the exterior rearview mirror assemblies described in U.S. Pat. Nos. 9,827,913; 9,346,403; 9,067,541; 8,915,601; 8,764,256; 7,722,199; 7,314,285; 7,267,449; 7,159,992; 7,104,663; 7,093,946; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999 and/or 5,703,731, and/or U.S. Publication No. US-2007-002477, which are all hereby incorporated herein by reference in their entireties.

Optionally, for example, the mirror assembly allows for new technology or content to be readily added to and mounted into the mirror head. For example, the mirror head may include a camera disposed behind the reflective element, and/or the mirror head may include a display screen (such as a liquid crystal display screen or the like) disposed behind the reflective element and/or the mirror head may include any other electronic or mechanical content, such as, for example, a blind spot indicator and/or a turn signal indicator and/or an illumination module and/or wide angle reflector elements and/or the like.

Optionally, the reflective element may comprise a frameless reflective element, such as the types shown and/or described in U.S. Des. Pat. Nos. 7,253,723; 8,154,418; 8,508,831; 8,730,553; 9,598,016 and/or 9,346,403, and/or U.S. Publication Nos. US-2014-0313563 and/or US-2015-0097955, which are hereby incorporated herein by reference in their entireties. In such an application, the mirror reflective element may have a rounded or ground perimeter edge region at its periphery of the front surface, and such a rounded or ground or polished perimeter edge region of the glass substrate of the reflective element may be exposed to, contactable by and/or viewable by the driver of the vehicle and may comprise a polished perimeter that is polished to a water-clear finish and may have a radius of curvature of at least about 2.5 mm. The rounded perimeter edge of the glass substrate of the mirror reflective element may provide a generally smooth or continuous transition from the generally planar (or slightly curved) front surface of the mirror reflective element to the outer surface of the mirror head or mirror casing at which the mirror reflective element is mounted. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, other mirror designs or configurations may be contemplated, such as various configurations of the mirror casing and reflective element and any bezel at the mirror reflective element. Optionally, the mirror casing (or separate bezel portion of the mirror casing) may circumscribe the periphery of the mirror reflective element to provide a generally smooth or continuous transition from the generally planar (or slightly curved) front surface of the mirror reflective element to the outer surface of the mirror head or mirror casing at which the mirror reflective element is mounted. For example, the mirror casing may comprise a plastic molding (such as formed via injection molding of a polymeric material) that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, and that does not encroach onto the outer glass first surface of the glass substrate, such as described in U.S. Pat. Nos. 7,255,541; 7,289,037; 7,360,932; 8,049,640 and/or 8,529,108, which are hereby incorporated herein by reference in their entireties. Optionally, the mirror assembly may include a conventional bezel, such as described in U.S. Pat. No. 7,224,324, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,420,036; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or International Publication No. WO 2010/114825, which are hereby incorporated herein by reference in their entireties.

The exterior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. Pat. Pub. Nos. US-2006-0061008 and/or US-2006-0050018, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:

a mounting arm comprising (i) an attaching end configured for attachment at an exterior portion of a vehicle equipped with the vehicular exterior rearview mirror assembly and (ii) a distal end distal from the attaching end;

a mirror head comprising a mirror reflective element;

wherein the distal end of the mounting arm is received through an aperture in the mirror head;

an electrically operable actuator disposed at the distal end of the mounting arm within the mirror head;

wherein the actuator is electrically operable to adjust the mirror head relative to the mounting arm, and wherein, when the actuator is electrically operating to adjust the mirror head relative to the mounting arm, the mirror reflective element moves in tandem with the mirror head relative to the mounting arm;

wherein the aperture allows for movement of the mirror head relative to the mounting arm;

an actuator attachment element that attaches at the mirror head, wherein the actuator attachment element moves in tandem with the mirror head relative to the mounting arm when the actuator is electrically operated to adjust the mirror head relative to the mounting arm;

wherein the actuator comprises first and second electrically operable motors that drive respective first and second gears;

an arcuate first pivot gear disposed at the actuator attachment element, wherein the arcuate first pivot gear moves in tandem with the actuator attachment element and the mirror head relative to the mounting arm when the actuator is electrically operated to adjust the mirror head relative to the mounting arm;

wherein the first gear engages the arcuate first pivot gear disposed at the actuator attachment element, and wherein, when the first electrically operable motor is electrically operated, the arcuate first pivot gear and actuator attachment element pivot relative to the actuator to adjust the mirror head relative to the mounting arm about a first pivot axis;

a second pivot gear disposed at the distal end of the mounting arm and rotationally fixed relative to the mounting arm;

wherein the second gear engages the second pivot gear, and wherein, when the second electrically operable motor is electrically operated, the actuator moves relative to the second pivot gear to adjust the mirror head relative to the mounting arm about a second pivot axis;

wherein the actuator comprises a first pivot memory element that electronically tracks position of the actuator relative to the actuator attachment element as the mirror head pivots about the first pivot axis; and wherein the actuator comprises a second pivot memory element that electronically tracks position of the actuator relative to the second pivot gear as the mirror head pivots about the second pivot axis.

2. The vehicular exterior rearview mirror assembly of claim 1, wherein the first and second gears each comprise respective clutch subassemblies that allow for adjustment of the mirror head about the first and second pivot axes independent of electric operation of the respective first and second electrically operable motors during manual adjustment of the mirror head.

3. The vehicular exterior rearview mirror assembly of claim 1, wherein the first pivot memory element comprises a first pivot printed circuit board and an electrically conductive first pivot wiper element that (i) engages an electrically conductive first pivot trace of the first pivot printed circuit board and (ii) moves along the first pivot trace as the mirror head pivots about the first pivot axis to electronically track a location of the first pivot wiper element along the first pivot trace.

4. The vehicular exterior rearview mirror assembly of claim 3, wherein the first pivot printed circuit board is fixed relative to the actuator and the first pivot wiper element is attached to the arcuate first pivot gear so that as the arcuate first pivot gear pivots relative to the actuator, the first pivot wiper element moves along the first pivot trace.

5. The vehicular exterior rearview mirror assembly of claim 1, wherein the second pivot memory element comprises a second pivot printed circuit board and an electrically conductive second pivot wiper element that (i) engages an electrically conductive second pivot trace of the second pivot printed circuit board and (ii) moves along the second pivot trace as the mirror head pivots about the second pivot axis to electronically track a location of the second pivot wiper element along the second pivot trace.

6. The vehicular exterior rearview mirror assembly of claim 5, wherein the second pivot wiper element is fixed relative to the actuator so that as the actuator pivots about the second pivot axis, the second pivot wiper element moves along the second pivot trace.

7. The vehicular exterior rearview mirror assembly of claim 1, wherein a memory position function of the mirror head operates, via the first and second pivot memory elements, to electronically track and store in memory a position of the mirror head about the first and second pivot axes and, responsive to an input, operates the actuator to pivot the mirror head to the stored position.

8. The vehicular exterior rearview mirror assembly of claim 1, wherein the mirror head is movable relative to the mounting arm between at least an extended position, where the mirror head is extended outward from a side of the vehicle so that the mirror reflective element is positioned to provide a rearward view at the side of the vehicle to a driver of the vehicle, and a folded position, where the mirror head is moved inward from the extended position toward the side of the vehicle.

9. The vehicular exterior rearview mirror assembly of claim 8, wherein, when the actuator is electrically operated to move the mirror head between the extended position and the folded position, the actuator moves the mirror head about the second pivot axis.

10. The vehicular exterior rearview mirror assembly of claim 8, wherein the mirror head is movable relative to the mounting arm from the folded position to a tuck position, where, with the mirror head in the folded position, the actuator is electrically operated to move the mirror head about the first pivot axis to tilt the mirror head downward and inward towards the side of the vehicle.

11. The vehicular exterior rearview mirror assembly of claim 8, wherein, with the mirror head in the extended position and when the actuator is electrically operated to adjust the rearward view provided to the driver of the vehicle, the actuator adjusts the mirror head about the first pivot axis or the second pivot axis at a first speed, and wherein, when the actuator is electrically operated to move the mirror head between the extended position and the folded position, the actuator moves the mirror head at a second speed that is greater than the first speed.

12. The vehicular exterior rearview mirror assembly of claim 1, wherein the second pivot gear comprises a two-piece output gear having a first toothed portion and a second toothed portion, wherein the first toothed portion and the second toothed portion are axially movable relative to one another, and wherein, when the second electrically operable motor is not electrically operated, the first toothed portion and the second toothed portion are biased toward engagement with one another and respective teeth of the first toothed portion and the second toothed portion are misaligned to preclude movement of the second gear relative to the second pivot gear, and wherein, when the second electrically operable motor is electrically operated, the first toothed portion and the second toothed portion are spaced from one another to align the respective teeth of the first toothed portion and the second toothed portion to allow movement of the second gear relative to the second pivot gear.

13. The vehicular exterior rearview mirror assembly of claim 12, wherein, when the second electrically operable motor is not electrically operated, the first toothed portion is biased toward engagement with the second toothed portion via a biasing element of the actuator.

14. The vehicular exterior rearview mirror assembly of claim 12, wherein, when the second electrically operable motor is not electrically operated and the respective teeth of the first toothed portion and the second toothed portion are misaligned, the respective teeth of the first toothed portion and the second toothed portion engage opposite sides of teeth of the second gear to preclude movement of the second gear relative to the second pivot gear.

15. The vehicular exterior rearview mirror assembly of claim 12, wherein, when the second electrically operable motor is not electrically operated, the first toothed portion and the second toothed portion engage one another via respective detents, and wherein, when the second electrically operable motor is electrically operated, rotation of the second gear causes the first toothed portion and the second toothed portion to move axially away from one another along the respective detents to align the respective teeth of the first toothed portion and the second toothed portion.

16. The vehicular exterior rearview mirror assembly of claim 1, wherein, with the attaching end of the mounting arm attached at the exterior portion of the vehicle, the first pivot axis comprises a horizontal pivot axis and the second pivot axis comprises a vertical pivot axis.

17. A vehicular exterior rearview mirror assembly, the vehicular exterior rearview mirror assembly comprising:

a mounting arm comprising (i) an attaching end configured for attachment at an exterior portion of a vehicle equipped with the vehicular exterior rearview mirror assembly and (ii) a distal end distal from the attaching end;

a mirror head comprising a mirror reflective element;

wherein the distal end of the mounting arm is received through an aperture in the mirror head;

an electrically operable actuator disposed at the distal end of the mounting arm within the mirror head;

wherein the actuator is electrically operable to adjust the mirror head relative to the mounting arm, and wherein, when the actuator is electrically operating to adjust the mirror head relative to the mounting arm, the mirror reflective element moves in tandem with the mirror head relative to the mounting arm;

wherein the aperture allows for movement of the mirror head relative to the mounting arm;

an actuator attachment element that attaches at the mirror head, wherein the actuator attachment element moves in tandem with the mirror head relative to the mounting arm when the actuator is electrically operated to adjust the mirror head relative to the mounting arm;

wherein the actuator comprises first and second electrically operable motors that drive respective first and second gears;

an arcuate first pivot gear disposed at the actuator attachment element, wherein the arcuate first pivot gear moves in tandem with the actuator attachment element and the mirror head relative to the mounting arm when the actuator is electrically operated to adjust the mirror head relative to the mounting arm;

wherein the first gear engages the arcuate first pivot gear disposed at the actuator attachment element, and wherein, when the first electrically operable motor is electrically operated, the arcuate first pivot gear and actuator attachment element pivot relative to the actuator to adjust the mirror head relative to the mounting arm about a first pivot axis;

a second pivot gear disposed at the distal end of the mounting arm and rotationally fixed relative to the mounting arm;

wherein the second gear engages the second pivot gear, and wherein, when the second electrically operable motor is electrically operated, the actuator moves relative to the second pivot gear to adjust the mirror head relative to the mounting arm about a second pivot axis;

wherein the actuator comprises a first pivot memory element that electronically tracks position of the actuator relative to the actuator attachment element as the mirror head pivots about the first pivot axis;

wherein the actuator comprises a second pivot memory element that electronically tracks position of the actuator relative to the second pivot gear as the mirror head pivots about the second pivot axis;

wherein the first pivot memory element comprises a first pivot printed circuit board and an electrically conductive first pivot wiper element that (i) engages an electrically conductive first pivot trace of the first pivot printed circuit board and (ii) moves along the first pivot trace as the mirror head pivots about the first pivot axis to electronically track a location of the first pivot wiper element along the first pivot trace; and wherein the second pivot memory element comprises a second pivot printed circuit board and an electrically conductive second pivot wiper element that (i) engages an electrically conductive second pivot trace of the second pivot printed circuit board and (ii) moves along the second pivot trace as the mirror head pivots about the second pivot axis to electronically track a location of the second pivot wiper element along the second pivot trace.

18. The vehicular exterior rearview mirror assembly of claim 17, wherein the first pivot printed circuit board is fixed relative to the actuator and the first pivot wiper element is attached to the arcuate first pivot gear so that as the arcuate first pivot gear pivots relative to the actuator, the first pivot wiper element moves along the first pivot trace, and wherein the second pivot wiper element is fixed relative to the actuator so that as the actuator pivots about the second pivot axis, the second pivot wiper element moves along the second pivot trace.

19. The vehicular exterior rearview mirror assembly of claim 17, wherein a memory position function of the mirror head, via the first and second pivot memory elements, operates to electronically track and store in memory a position of the mirror head about the first and second pivot axes and, responsive to an input, operates the actuator to pivot the mirror head to the stored position.

20. The vehicular exterior rearview mirror assembly of claim 17, wherein the mirror head is movable relative to the mounting arm between at least an extended position, where the mirror head is extended outward from a side of the vehicle so that the mirror reflective element is positioned to provide a rearward view at the side of the vehicle to a driver of the vehicle, and a folded position, where the mirror head is moved inward from the extended position toward the side of the vehicle.

21. The vehicular exterior rearview mirror assembly of claim 20, wherein, with the mirror head in the extended position and when the actuator is electrically operated to adjust the rearward view provided to the driver of the vehicle, the actuator adjusts the mirror head about the first pivot axis or the second pivot axis at a first speed, and wherein, when the actuator is electrically operated to move the mirror head between the extended position and the folded position, the actuator moves the mirror head at a second speed that is greater than the first speed.

22. A vehicular exterior rearview mirror assembly, the vehicular exterior rearview mirror assembly comprising:

a mounting arm comprising (i) an attaching end configured for attachment at an exterior portion of a vehicle equipped with the vehicular exterior rearview mirror assembly and (ii) a distal end distal from the attaching end;

a mirror head comprising a mirror reflective element;

wherein the distal end of the mounting arm is received through an aperture in the mirror head;

an electrically operable actuator disposed at the distal end of the mounting arm within the mirror head;

wherein the actuator is electrically operable to adjust the mirror head relative to the mounting arm, and wherein, when the actuator is electrically operating to adjust the mirror head relative to the mounting arm, the mirror reflective element moves in tandem with the mirror head relative to the mounting arm;

wherein the aperture allows for movement of the mirror head relative to the mounting arm;

wherein the mirror head is movable relative to the mounting arm between at least an extended position, where the mirror head is extended outward from a side of the vehicle so that the mirror reflective element is positioned to provide a rearward view at the side of the vehicle to a driver of the vehicle, and a folded position, where the mirror head is moved inward from the extended position toward the side of the vehicle;

an actuator attachment element that attaches at the mirror head, wherein the actuator attachment element moves in tandem with the mirror head relative to the mounting arm when the actuator is electrically operated to adjust the mirror head relative to the mounting arm;

wherein the actuator comprises first and second electrically operable motors that drive respective first and second gears;

an arcuate first pivot gear disposed at the actuator attachment element, wherein the arcuate first pivot gear moves in tandem with the actuator attachment element and the mirror head relative to the mounting arm when the actuator is electrically operated to adjust the mirror head relative to the mounting arm;

wherein the first gear engages the arcuate first pivot gear disposed at the actuator attachment element, and wherein, when the first electrically operable motor is electrically operated, the arcuate first pivot gear and actuator attachment element pivot relative to the actuator to adjust the mirror head relative to the mounting arm about a first pivot axis;

a second pivot gear disposed at the distal end of the mounting arm and rotationally fixed relative to the mounting arm;

wherein the second gear engages the second pivot gear, and wherein, when the second electrically operable motor is electrically operated, the actuator moves relative to the second pivot gear to adjust the mirror head relative to the mounting arm about a second pivot axis;

wherein, when the actuator is electrically operated to move the mirror head between the extended position and the folded position, the actuator moves the mirror head about the second pivot axis;

wherein the second pivot gear comprises a two-piece output gear having a first toothed portion and a second toothed portion, and wherein the first toothed portion and the second toothed portion are axially movable relative to one another;

wherein, when the second electrically operable motor is not electrically operated, the first toothed portion and the second toothed portion are biased toward engagement with one another and respective teeth of the first toothed portion and the second toothed portion are misaligned to preclude movement of the second gear relative to the second pivot gear;

wherein, when the second electrically operable motor is electrically operated, the first toothed portion and the second toothed portion are spaced from one another to align the respective teeth of the first toothed portion and the second toothed portion to allow movement of the second gear relative to the second pivot gear;

wherein the actuator comprises a first pivot memory element that electronically tracks position of the actuator relative to the actuator attachment element as the mirror head pivots about the first pivot axis; and wherein the actuator comprises a second pivot memory element that electronically tracks position of the actuator relative to the second pivot gear as the mirror head pivots about the second pivot axis.

23. The vehicular exterior rearview mirror assembly of claim 22, wherein the first pivot memory element comprises a first pivot printed circuit board and an electrically conductive first pivot wiper element that (i) engages an electrically conductive first pivot trace of the first pivot printed circuit board and (ii) moves along the first pivot trace as the mirror head pivots about the first pivot axis to electronically track a location of the first pivot wiper element along the first pivot trace.

24. The vehicular exterior rearview mirror assembly of claim 23, wherein the first pivot printed circuit board is fixed relative to the actuator and the first pivot wiper element is attached to the arcuate first pivot gear so that as the arcuate first pivot gear pivots relative to the actuator, the first pivot wiper element moves along the first pivot trace.

25. The vehicular exterior rearview mirror assembly of claim 22, wherein the second pivot memory element comprises a second pivot printed circuit board and an electrically conductive second pivot wiper element that (i) engages an electrically conductive second pivot trace of the second pivot printed circuit board and (ii) moves along the second pivot trace as the mirror head pivots about the second pivot axis to electronically track a location of the second pivot wiper element along the second pivot trace.

26. The vehicular exterior rearview mirror assembly of claim 25, wherein the second pivot wiper element is fixed relative to the actuator so that as the actuator pivots about the second pivot axis, the second pivot wiper element moves along the second pivot trace.

27. The vehicular exterior rearview mirror assembly of claim 22, wherein, when the second electrically operable motor is not electrically operated, the first toothed portion is biased toward engagement with the second toothed portion via a biasing element of the actuator.

28. The vehicular exterior rearview mirror assembly of claim 22, wherein, when the second electrically operable motor is not electrically operated and the respective teeth of the first toothed portion and the second toothed portion are misaligned, the respective teeth of the first toothed portion and the second toothed portion engage opposite sides of teeth of the second gear to preclude movement of the second gear relative to the second pivot gear.

29. The vehicular exterior rearview mirror assembly of claim 22, wherein, when the second electrically operable motor is not electrically operated, the first toothed portion and the second toothed portion engage one another via respective detents, and wherein, when the second electrically operable motor is electrically operated, rotation of the second gear causes the first toothed portion and the second toothed portion to move axially away from one another along the respective detents to align the respective teeth of the first toothed portion and the second toothed portion.

* * * * *